(12) United States Patent
You et al.

(10) Patent No.: US 10,517,083 B2
(45) Date of Patent: Dec. 24, 2019

(54) METHOD AND USER EQUIPMENT FOR RECEIVING DOWNLINK CONTROL INFORMATION, AND METHOD AND BASE STATION FOR TRANSMITTING DOWNLINK CONTROL INFORMATION

(71) Applicant: LG ELECTRONICS INC., Seoul (KR)

(72) Inventors: Hyangsun You, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/762,458

(22) PCT Filed: Sep. 21, 2016

(86) PCT No.: PCT/KR2016/010542
§ 371 (c)(1),
(2) Date: Mar. 22, 2018

(87) PCT Pub. No.: WO2017/052199
PCT Pub. Date: Mar. 30, 2017

(65) Prior Publication Data
US 2018/0279268 A1 Sep. 27, 2018

Related U.S. Application Data

(60) Provisional application No. 62/233,298, filed on Sep. 25, 2015, provisional application No. 62/251,759, filed on Nov. 6, 2015.

(51) Int. Cl.
*H04W 72/04* (2009.01)
*H04W 74/08* (2009.01)
(Continued)

(52) U.S. Cl.
CPC ............ *H04W 72/042* (2013.01); *H04L 5/00* (2013.01); *H04L 5/0035* (2013.01);
(Continued)

(58) Field of Classification Search
CPC ........... H04W 72/042; H04W 74/0833; H04W 88/02; H04W 88/08; H04L 5/00; H04L 5/0053; H04L 5/0035
See application file for complete search history.

(56) References Cited

U.S. PATENT DOCUMENTS

2014/0086173 A1* 3/2014 Sadeghi ................. H04L 5/005
370/329
2014/0128085 A1* 5/2014 Charbit .................... H04L 5/00
455/450

(Continued)

OTHER PUBLICATIONS

LG Electronics; "Discussion on Resource configuration for low complexity MTC UEs," 3GPP TSG RAN WG1 Meeting #81, May 25-29, 2015, R1-152696.
(Continued)

*Primary Examiner* — Brian D Nguyen
(74) *Attorney, Agent, or Firm* — Dentons US LLP

(57) ABSTRACT

A search space (hereinafter, CSS) for a control channel for scheduling a random access response may be configured by a system information block. A user equipment (UE) may attempt to receive a control channel for a random access response on the assumption that CSS is configured in accordance with a configuration based on the system information block. The UE may attempt to receive the control channel within a UE-specific search space (USS) by assuming that the USS is configured in accordance with the configuration of the CSS until a configuration for the USS is received.

16 Claims, 11 Drawing Sheets

(51) Int. Cl.
*H04L 5/00* (2006.01)
*H04W 88/02* (2009.01)
*H04W 88/08* (2009.01)

(52) U.S. Cl.
CPC ....... *H04L 5/0053* (2013.01); *H04W 74/0833* (2013.01); *H04W 88/02* (2013.01); *H04W 88/08* (2013.01)

(56) References Cited

U.S. PATENT DOCUMENTS

| | | | |
|---|---|---|---|
| 2014/0133331 A1* | 5/2014 | Fu | H04L 5/00 370/252 |
| 2014/0307560 A1 | 10/2014 | Kim et al. | |
| 2015/0181577 A1 | 6/2015 | Moulsley | |
| 2016/0043849 A1* | 2/2016 | Lee | H04L 5/0053 370/329 |
| 2016/0150508 A1* | 5/2016 | Golitschek Edler von Elbwart | H04L 5/001 370/329 |
| 2016/0205669 A1* | 7/2016 | Kusashima | H04W 72/042 370/280 |

OTHER PUBLICATIONS

Ericsson; "EPDCCH initialization for MTC," 3GPP TSG RAN WG1 Meeting #82, Aug. 24-28, 2015, R1-153731.
LG Electronics; "Discussion on Resource configuration for low complexity MTC UEs," 3GPP TSG RAN WG1 Meeting #82, Aug. 24-28, 2015, R1-154229.
LG Electronics, "Configurations for M-PDCCH search space," 3GPP TSG RAN WG1 Meeting #82, Aug. 24-25, 2015, R1-154233.
Zte; "Further considerations on M-PDCCH for MTC," 3GPP TSG RAN WG1 Meeting #82, Aug. 24-28, 2015, R1-154432.

* cited by examiner

[Fig. 1]
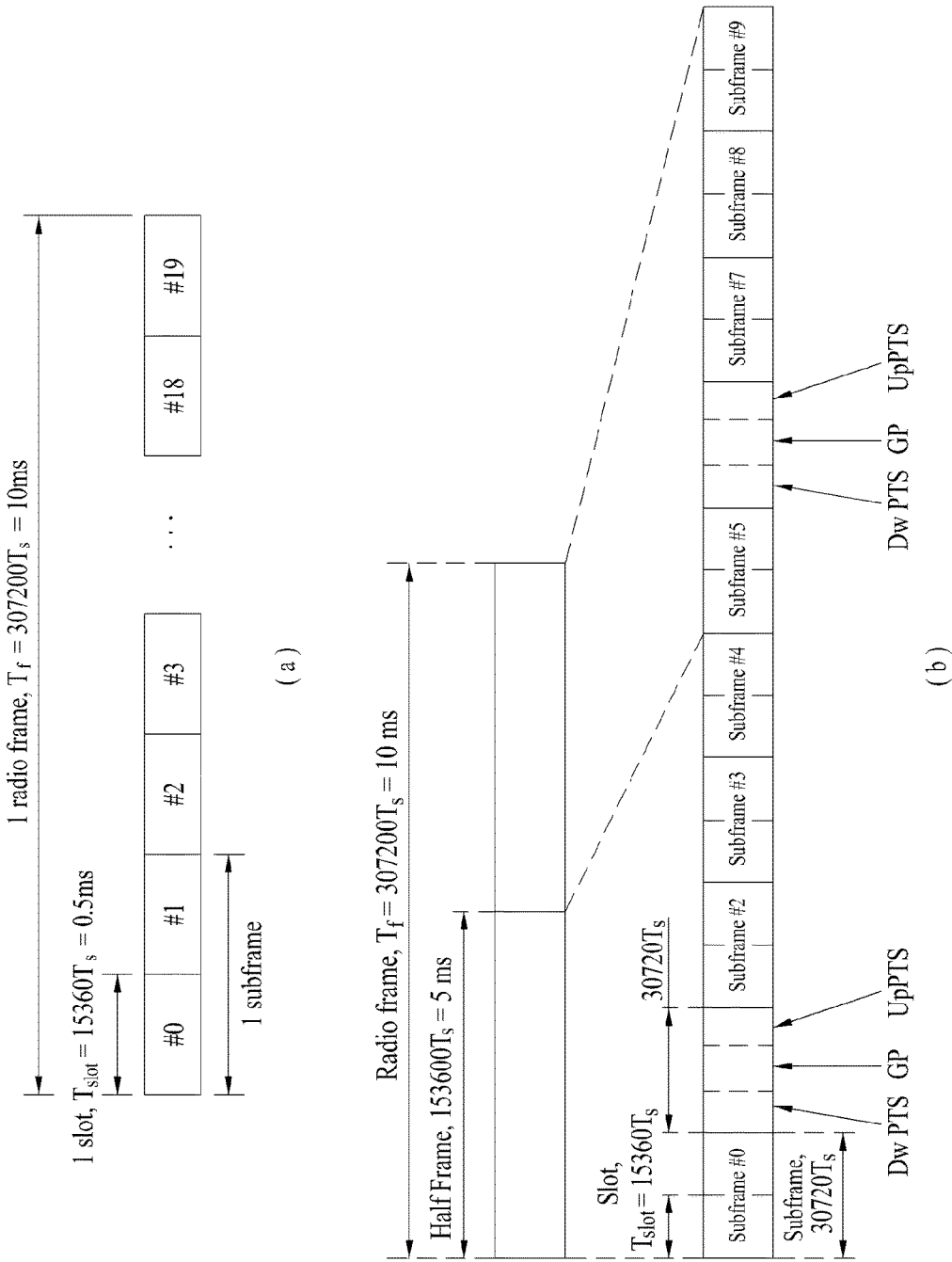

[Fig. 2]
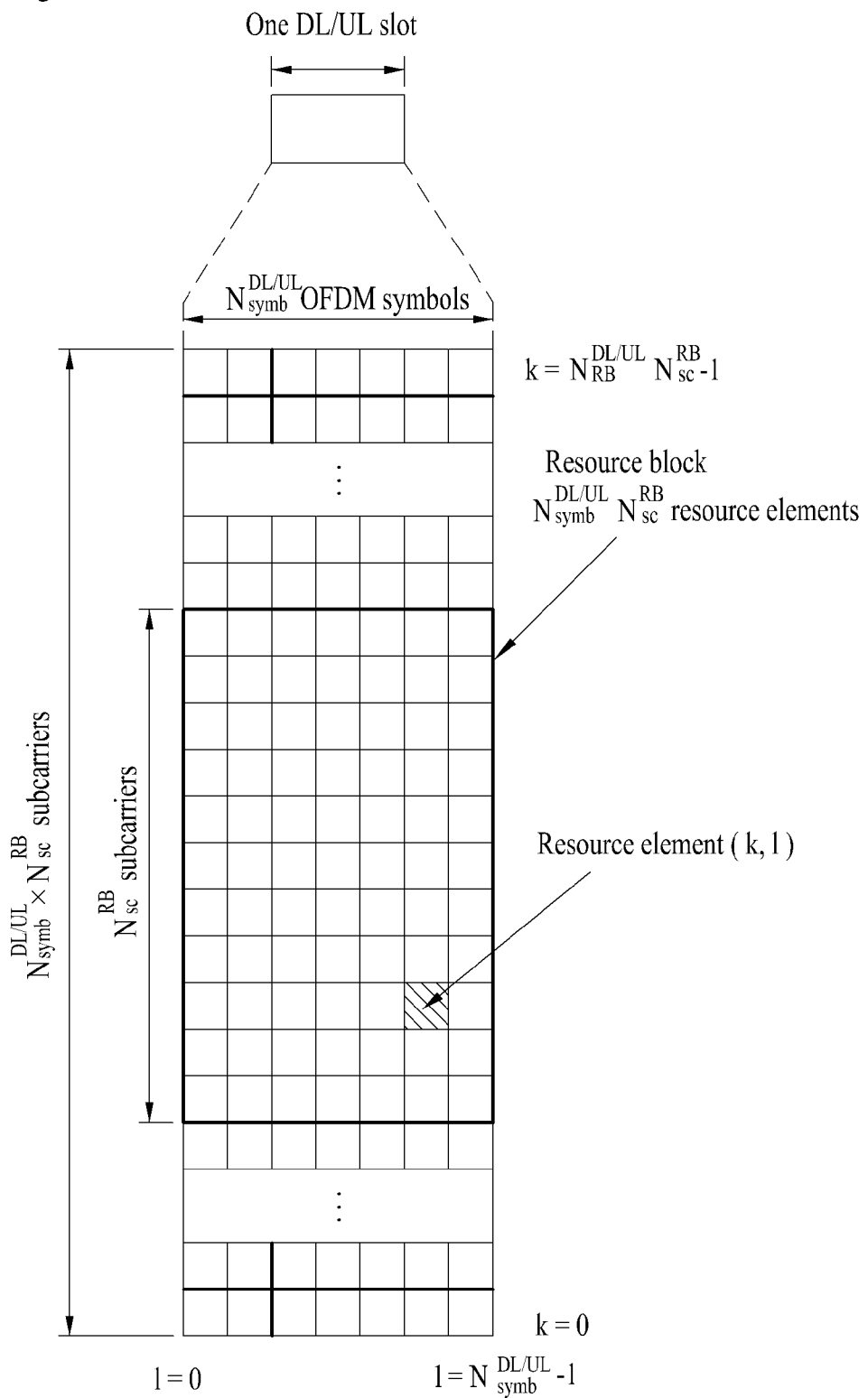

[Fig. 3]
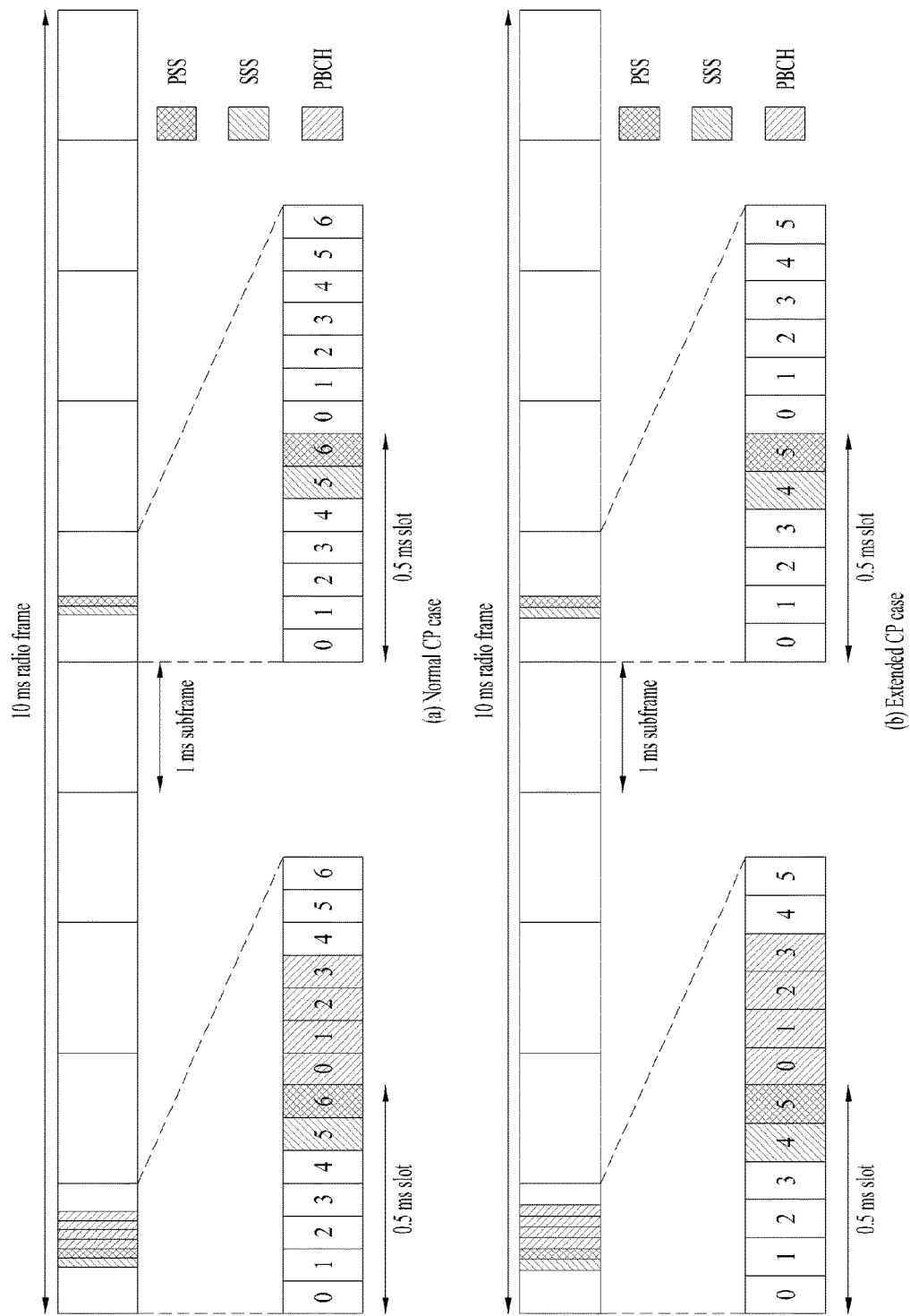

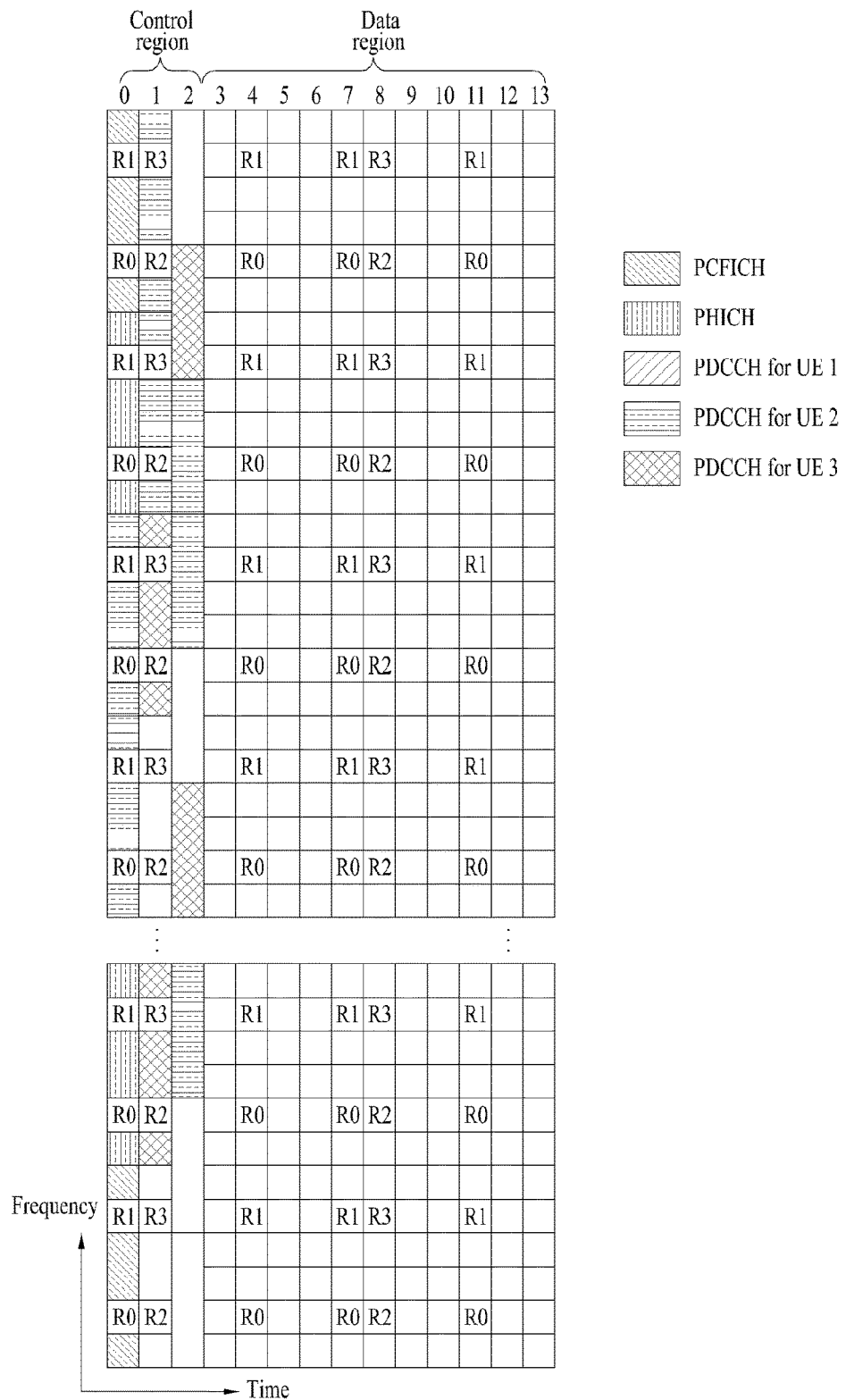
[Fig. 4]

[Fig. 5]
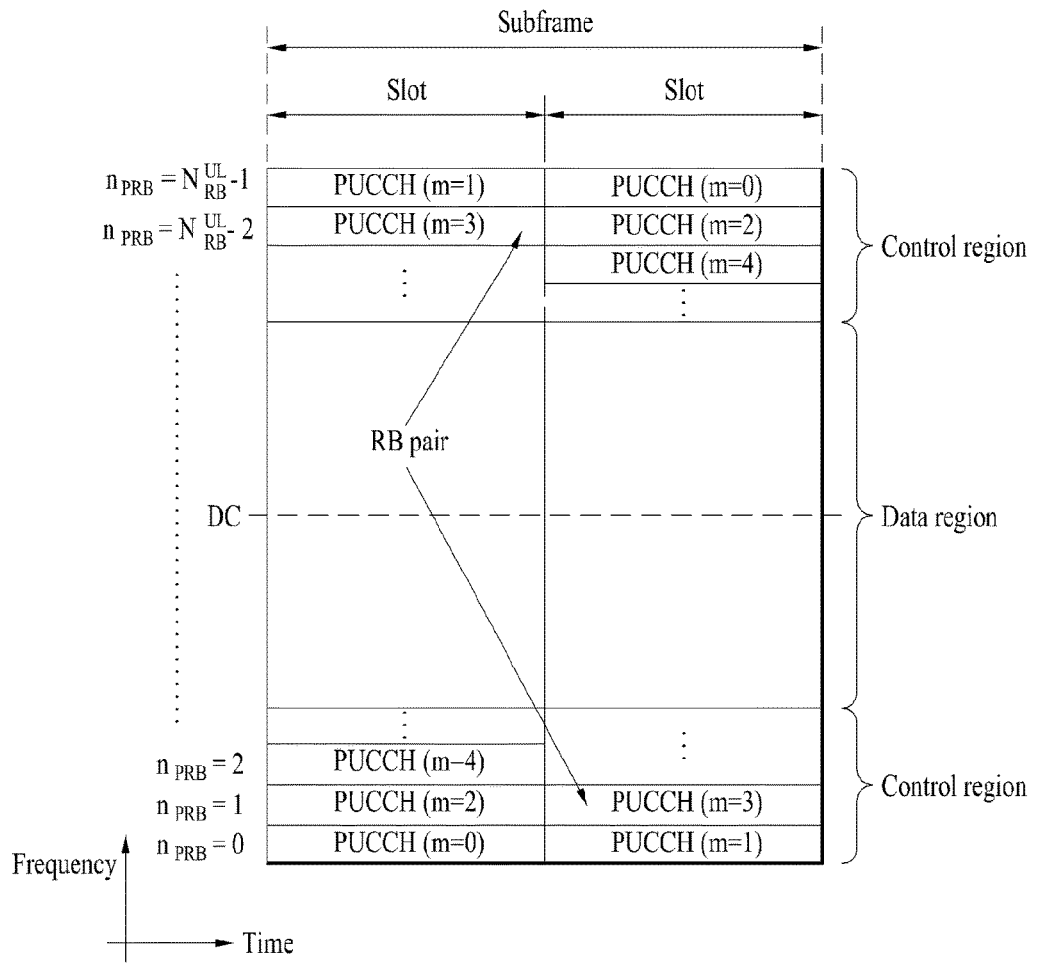
[Fig. 6]
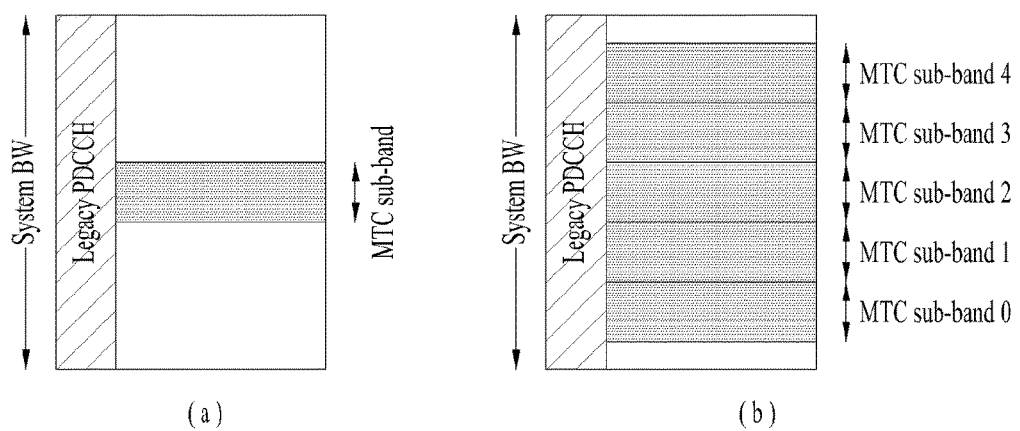

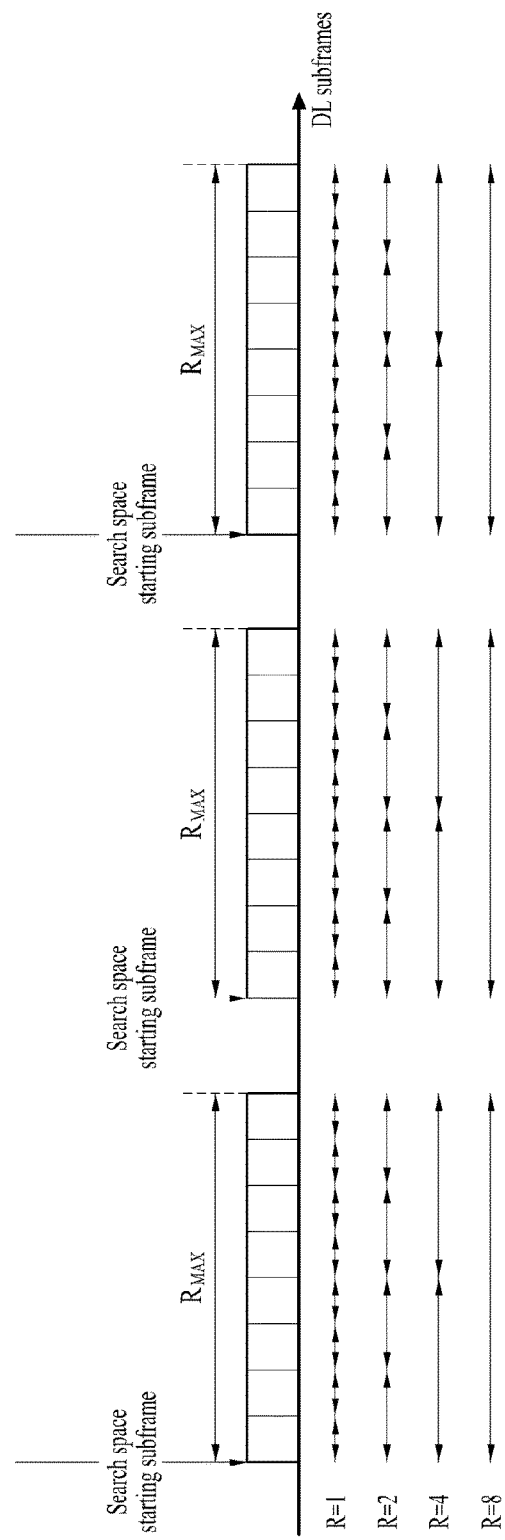
[Fig. 7]

[Fig. 8]
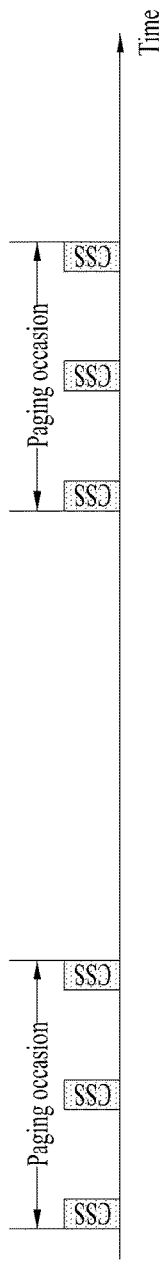
[Fig. 9]
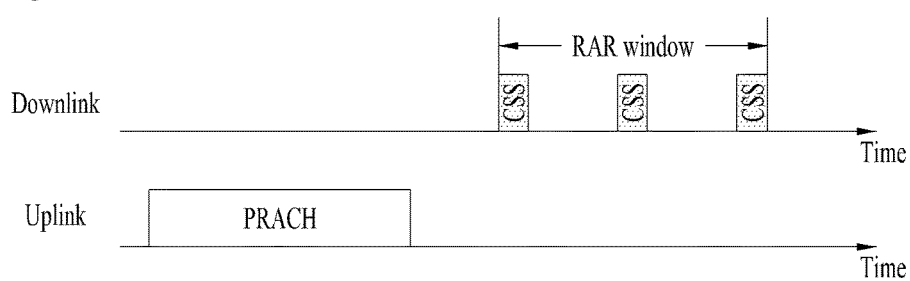

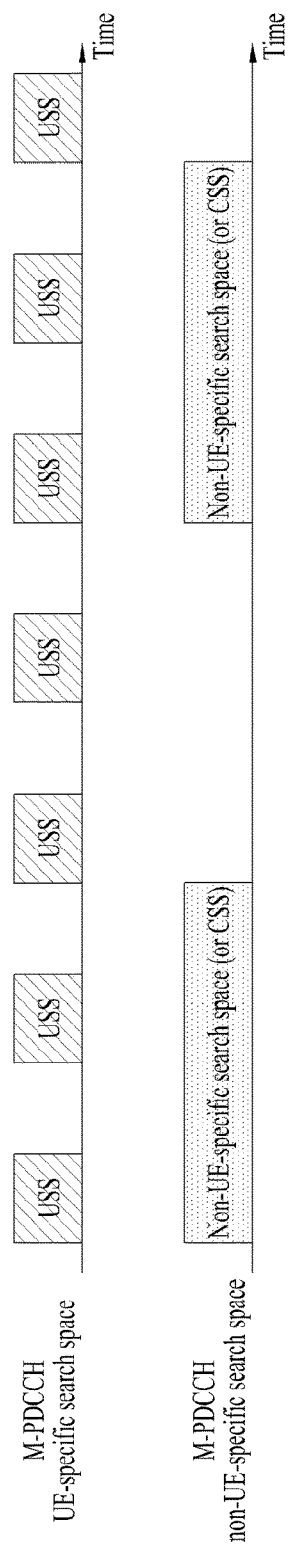
[Fig. 10]

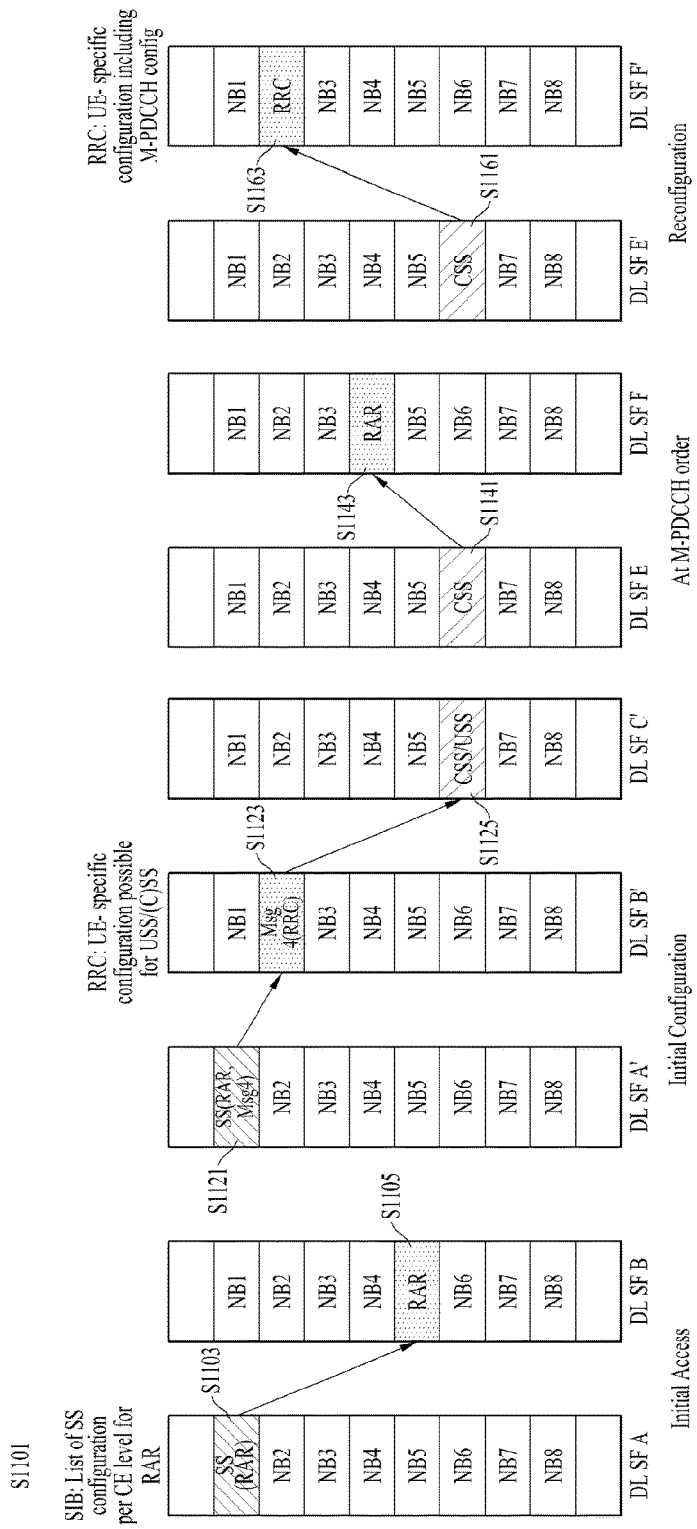
[Fig. 11]

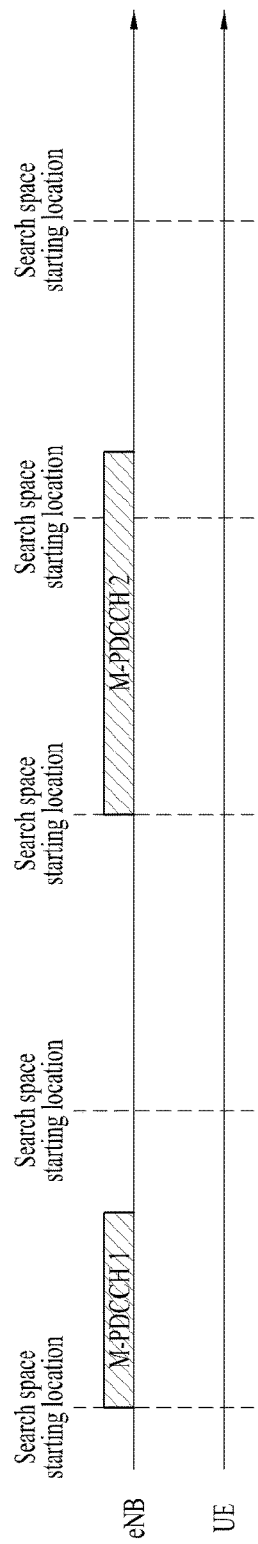
[Fig. 12]

[Fig. 13]
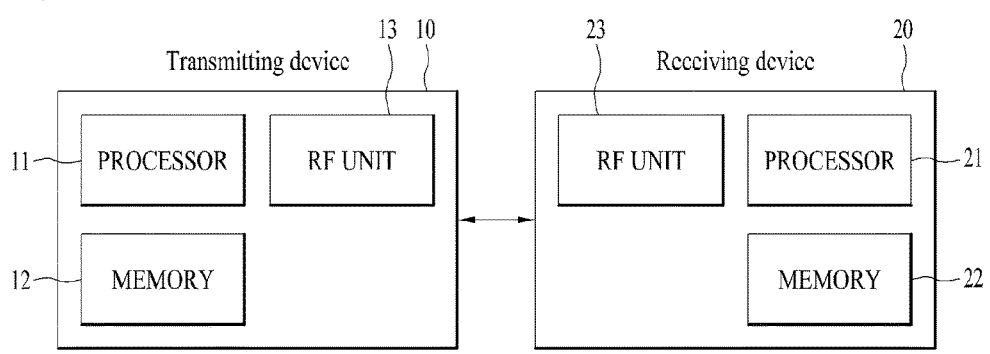

METHOD AND USER EQUIPMENT FOR RECEIVING DOWNLINK CONTROL INFORMATION, AND METHOD AND BASE STATION FOR TRANSMITTING DOWNLINK CONTROL INFORMATION

This application is a 35 use § 371 national stage entry of international application no. PCT/KR2016/010542 filed on Sep. 21, 2016, and claims priority to U.S. provisional application nos. 62/233,298 filed on Sep. 25, 2015 and 62/251,759 filed on Nov. 6, 2015, all of which are hereby incorporated by reference in their entireties as if fully set forth herein.

TECHNICAL FIELD

The present invention relates to a wireless communication system, and more particularly, to a method for transmitting or receiving downlink control information and a device therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE OF INVENTION

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

The technical objects that can be achieved through the present invention are not limited to what has been particularly described hereinabove and other technical objects not described herein will be more clearly understood by persons skilled in the art from the following detailed description.

Solution to Problem

A search space (hereinafter, CSS_RAR) for a control channel for scheduling a random access response may be configured by a system information block. A user equipment (UE) may attempt to receive a control channel for a random access response by assuming that CSS_RAR is configured in accordance with a configuration based on the system information block. If the UE receives the control channel for a random access response, the UE may receive the random access response to a random access preamble transmitted therefrom in accordance with control information carried by the control channel. The UE may attempt to receive a control channel within a UE-specific search space (hereinafter, USS) by assuming that the USS is configured in accordance with the configuration of the CSS until a configuration for the USS is received.

In an aspect of the present invention, provided herein is a method for receiving, by a user equipment (UE), downlink control information (DCI) for the UE. The method comprises: receiving, by the UE, a common search space configuration for a common search space; receiving, by the UE, a first physical downlink control channel (PDCCH) scheduling a random access response; and receiving, by the UE, a second PDCCH carrying the DCI for the UE. The UE can monitor first PDCCH candidates of the common search space according to the common search space configuration in order to receive the first PDCCH. The UE can monitor second PDCCH candidates of a UE-specific search space in order to receive the second PDCCH. The UE can assume that configuration of the UE-specific search space is the same as that of the common search space until the UE receives a UE-specific search space configuration.

In another aspect of the present invention, provided herein is a method for transmitting, by a base station (BS), downlink control information (DCI) for a user equipment (UE). The method comprises: transmitting, by the BS, common search space configuration for a common search space; transmitting, by the BS to the UE, a first physical downlink control channel (PDCCH) scheduling a random access response; and transmitting, by the BS to the UE, a second PDCCH carrying the DCI for the UE. The BS can transmit the first PDCCH by using one of first PDCCH candidates of the common search space according to the common search space configuration. The BS can transmit the second PDCCH by using one of second PDCCH candidates of a UE-specific search space. The BS can configure the UE-specific search space according to the same configuration as the common search space configuration until the BS transmits a UE-specific search space configuration to the UE.

In still another aspect of the present invention, provided herein a user equipment (UE) for receiving downlink control information (DCI) for the UE. The UE comprises a radio frequency (RF) unit and a processor connected to the RF unit. The processor can be configured to control the RF unit to receive common search space configuration for a common search space; control the RF unit to receive a first physical downlink control channel (PDCCH) scheduling a random access response; and control the RF unit to receive a second PDCCH carrying the DCI for the UE. The processor can be configured to monitor first PDCCH candidates of the common search space according to the common search space configuration in order to detect the first PDCCH. The processor can be configured to monitor second PDCCH candidates of a UE-specific search space in order to detect the second PDCCH. The processor can be configured to assume that configuration of the UE-specific search space is the same as that of the common search space until the UE receives a UE-specific search space configuration.

In a further aspect of the present invention, provided herein a base station (BS) for transmitting downlink control information (DCI) for a user equipment (UE). The BS comprises a radio frequency (RF) unit and a processor connected to the RF unit. The processor can be configured to control the RF unit to transmit common search space configuration for a common search space; control the RF unit to transmit a first physical downlink control channel (PDCCH) scheduling a random access response; and control the RF unit to transmit a second PDCCH carrying the DCI for the UE. The processor can be configured to control the RF unit to transmit the first PDCCH using one of first PDCCH candidates of the common search space according to the common search space configuration. The processor can be configured to control the RF unit to transmit the second PDCCH using one of second PDCCH candidates of a UE-specific search space. The processor can configure the UE-specific search space according to the same as that of the common search space until the BS transmits a UE-specific search space configuration.

In each aspect of the present invention, the common search space configuration can include information on a narrowband for the common search space. The second PDCCH candidates of the UE-specific search space can be configured on the same narrowband as the narrowband for the common search space until the UE-specific search space configuration is transmitted to the UE.

In each aspect of the present invention, the common search space configuration can include information on a maximum number of repetitions for the first common search space. The second PDCCH candidates of the UE-specific search space can be configured based on the same number as the maximum number of repetitions for the common search space until the UE-specific search space configuration is transmitted to the UE.

In each aspect of the present invention, the common search space configuration can include information on a first physical resource block (PRB) set for transmitting the first PDCCH. The same physical resource block set as the first PRB set can be used for the second PDCCH candidates until the UE-specific search space configuration is transmitted to the UE In each aspect of the present invention, the first PDCCH candidates of the common search space can be configured according to aggregation levels larger than or equal to 8 among a plurality of aggregation levels, whereas the second PDCCH candidates of the UE-specific search space can be configured according to the plurality of aggregation levels.

In each aspect of the present invention, the UE can transmit a random access preamble using a physical random access channel (PRACH) resource. The UE can monitor the first PDCCH candidates in response to transmission of the random access preamble. The UE can receive the random access response according to control information carried by the first PDCCH. The BS can receive a random access preamble using a physical random access channel (PRACH) resource. The BS can transmit the first PDCCH in response to reception of the random access preamble. The BS can transmit the random access response according to control information carried by the first PDCCH.

The above technical solutions are merely some parts of the embodiments of the present invention and various embodiments into which the technical features of the present invention are incorporated can be derived and understood by persons skilled in the art from the following detailed description of the present invention.

Advantageous Effects of Invention

According to the present invention, uplink/downlink signals can be efficiently transmitted/received. Therefore, overall throughput of a radio communication system can be improved.

According to one embodiment of the present invention, a low cost/complexity UE can perform communication with a BS at low cost while maintaining compatibility with a legacy system.

According to one embodiment of the present invention, the UE can be implemented at low cost/complexity.

According to one embodiment of the present invention, coverage can be enhanced.

According to one embodiment of the present invention, the UE and the BS can perform communication with each other at a narrowband.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF DRAWINGS

The accompanying drawings, which are included to provide a further understanding of the invention, illustrate embodiments of the invention and together with the description serve to explain the principle of the invention.

FIG. 1 illustrates the structure of a radio frame used in a wireless communication system.

FIG. 2 illustrates the structure of a downlink (DL)/uplink (UL) slot in a wireless communication system.

FIG. 3 illustrates a radio frame structure for transmission of a synchronization signal (SS).

FIG. 4 illustrates the structure of a DL subframe used in a wireless communication system.

FIG. 5 illustrates the structure of a UL subframe used in a wireless communication system.

FIG. 6 illustrates an example of a signal band for MTC.

FIG. 7 illustrates repeated transmission of a channel for coverage enhancement.

FIG. 8 illustrates a configuration of a common search space (CSS) for paging according to the present invention.

FIG. 9 illustrates a configuration of a common search space (CSS) for random access response (RAR) according to the present invention.

FIG. 10 illustrates the example of the monitoring time region of USS and CSS.

FIG. 11 illustrates a procedure of configuring a search space according to the present invention.

FIG. 12 illustrates a configuration of M-PDCCH repeated transmission according to the present invention.

FIG. 13 is a block diagram illustrating elements of a transmitting device 10 and a receiving device 20 for implementing the present invention.

MODE FOR THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE- RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms ($307,200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

FIG. 2 illustrates the structure of a DL/UL slot structure in a wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to as a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined. That is, a single antenna port transmission scheme or a transmission scheme transparent to a UE (e.g. precoding vector switching (PVS), time switched transmit diversity (TSTD), or cyclic delay diversity (CDD)) may be used for transmit diversity of an SS.

Upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

The UE, which has determined time and frequency parameters necessary for demodulating a DL signal and transmitting a UL signal at an accurate time by performing a cell search procedure using PSS/SSS, can communicate with the eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB 1), SIB Type 2 (SIB2), and SIB3 to SIB 17 in accordance with the parameters.

The MIB includes most frequently transmitted parameters which are essential for initial access of the UE to a network of the eNB. The UE may receive the MIB through a broadcast channel (e.g. PBCH). The MIB includes a DL bandwidth (BW), PHICH configuration, and a system frame number (SFN). Accordingly, the UE may be explicitly aware of information about the DL BW, SFN, and PHICH configuration by receiving the MIB. Meanwhile, information which may be implicitly recognized by the UE through reception of the PBCH includes the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The SIB 1 includes parameters needed to determine if a specific cell is suitable for cell selection, as well as information about time-domain scheduling of the other SIBs. The SIB 1 is received by the UE through broadcast signaling or dedicated signaling.

DL carrier frequency and corresponding system bandwidth may be acquired by the MIB carried by the PBCH. UL carrier frequency and corresponding system bandwidth may be acquired by system information which is a DL signal. The UE which has received the MIB applies a DL BW value within the MIB to a UL-bandwidth (UL BW) until system information block type 2 (SystemInformationBlockType2, SIB2) is received if there is no valid system information stored in a corresponding cell. For example, the UE may identify a full UL system band, which may be used by itself for UL transmission, through UL-carrier frequency and UL-bandwidth information within the SIB2 by acquiring system information block type 2 (SystemInformationBlockType2, SIB2).

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDDCH/PDSCH reception and PUSCH/PUCCH transmission as general uplink/downlink transmission procedures.

The random access procedure is also called RACH (random access channel) procedure. The random access procedure is used for initial access, uplink synchronization adjustment, resource assignment, handover, etc. The random access procedure is classified into a contention-based process and a dedicated (i.e. noncontention-based) process. The contention-based random access procedure includes initial access and is normally used, whereas the dedicated random access procedure is limitedly used for handover. In the contention-based random access procedure, a UE randomly select a RACH preamble sequence. Accordingly, a plurality of UEs can simultaneously transmit the same RACH preamble sequence and thus a contention resolution procedure is not needed. In the dedicated random access procedure, a UE uses a RACH preamble sequence uniquely allocated thereto by an eNB. Accordingly, the UE can perform the random access procedure without colliding with other UEs.

The contention-based random access procedure has the following four steps. Hereinafter, messages transmitted in steps 1 to 4 may be respectively referred to as Msg 1 to Msg 4.

Step 1: RACH preamble (via PRACH) (UE to eNB)
Step 2: Random access response (RAR) (via PDCCH and PDSCH) (eNB to UE)
Step 3: Layer 2/Layer 3 message (via PUSCH) (UE to eNB)
Step 4: Contention resolution message (eNB to UE)

The dedicated random access procedure includes the following three steps. Hereinafter, uplink transmission (i.e. step 3) corresponding to a RAR may be performed as a part of the random access procedure. The dedicated random access procedure can be triggered using a PDCCH (hereinafter, referred to as PDCCH order) used for an eNB to command RACH preamble transmission.

Step 0: PACH preamble allocation through dedicated signaling (eNB to UE)
Step 1: RACH preamble (via PRACH) (UE to eNB)
Step 2: RAR (via PDCCH and PDSCH) (eNB to UE)

After transmission of RACH preamble, the UE attempts to receive a random access response (RAR) within a predetermined time window. Specifically, the UE attempts to detect a PDCCH (hereinafter, referred to as RA-RNTI PDCCH) having an RA-RNTI (Random Access RNTI) (e.g., CRC is masked with RA-RNTI in the PDCCH) within the time window. The UE checks whether a RAR therefor is present in a PDSCH corresponding to the RA-RNTI PDCCH during RA-RNTI PDCCH detection. The RAR includes timing advance (TA) information indicating timing offset information for UL synchronization, UL resource allocation information (UL grant information), a temporary UE identifier (e.g., temporary cell-RNTI, TC-RNTI), etc. The UE can perform UL transmission (e.g., Msg3) in accordance with resource allocation information and TA value in the RAR. HARQ is applied to UL transmission corresponding to the RAR. Accordingly, the UE can receive acknowledgement information (e.g., PHICH) corresponding to Msg 3 after transmission of Msg 3.

The random access preamble, i.e., RACH preamble consists of a cyclic prefix of length $T_{CP}$ and a sequence part of length $T_{SEQ}$ in the physical layer. $T_{CP}$ and $T_{SEQ}$ depend on the frame structure and the random access configuration. The preamble format is controlled by higher layers. The following table shows examples of $T_{CP}$ and $T_{SEQ}$.

TABLE 3

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4(see NOTE) | $448 \cdot T_s$ | $4096 \cdot T_s$ |

NOTE:
Frame structure type 2 and special subframe configuration with UpPTS lengths $4384 \cdot T_s$ and $5120 \cdot T_s$ only.

The random access preamble is transmitted in UL subframe(s). The transmission of a random access preamble is restricted to certain time and frequency resources. These resources are called PRACH resources. The PRACH resources, are enumerated in increasing order of the subframe number within the radio frame and the PRBs in the frequency domain such that index 0 correspond to the lowest numbered PRB and subframe within the radio frame. PRACH resources within the radio frame are indicated by a PRACH configuration index.

For frame structure type 1 with preamble format 0-3, for each of the PRACH configurations there is at most one random access resource per subframe. The following table shows examples of the preamble formats and the subframes in which random access preamble transmission is allowed for a given configuration in frame structure type 1. The PRACH configuration index is given by a higher layer signal (transmitted by an eNB).

TABLE 4

| PRACH Configuration Index | Preamble Format | SFN | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |

TABLE 4-continued

| PRACH Configuration Index | Preamble Format | SFN | Subframe number |
|---|---|---|---|
| 61 | N/A | N/A | N/A |
| 62 | N/A | N/A | N/A |
| 63 | 3 | Even | 9 |

In Table 4, SFN denotes a system frame number.

The first PRB, $n^{RA}_{PRB}$, allocated to the PRACH opportunity considered for preamble formats 0, 1, 2 and 3 is defined by $n^{RA}_{PRB}=n^{RA}_{PRBoffset}$, where the PRACH frequency offset nAPRBoffset is a PRB configured by higher layers and satisfies $0 \leq n^{RA}_{PRBoffset} \leq N^{UL}_{RB}-6$.

In case of frame structure type 2 with preamble formats 0 to 4, a plurality of random access resources may exist within UL subframe (or UpPTS for preamble format 4) in accordance with UL/DL configuration. The random access resources for the frame structure type 2 are defined in accordance with PRACH configuration index (see 3GPP TS 36.211 standard document).

FIG. 4 illustrates the structure of a DL subframe used in a wireless communication system.

Referring to FIG. 4, A DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs.

A set of OFDM symbols available for the PDCCH at a subframe is given by the following Table.

TABLE 5

| Subframe | Number of OFDM symbols for PDCCH when $N^{DL}_{RB} > 10$ | Number of OFDM symbols for PDCCH when $N^{DL}_{RB} \leq 10$ |
|---|---|---|
| Subframe 1 and 6 for frame structure type 2 | 1, 2 | 2 |
| MBSFN subframes on a carrier supporting PDSCH, configured with 1 or 2 cell-specfic antenna ports | 1, 2 | 2 |
| MBSFN subframes on a carrier supporting PDSCH, configured with 4 cell-specific antenna ports | 2 | 2 |

TABLE 5-continued

| Subframe | Number of OFDM symbols for PDCCH when $N^{DL}_{RB} > 10$ | Number of OFDM symbols for PDCCH when $N^{DL}_{RB} \leq 10$ |
|---|---|---|
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as MBSFN subframe(s) by a higher layer. Each MBSFN subframe is divided into a non-MBSFN region and an MBSFN region. The non-MBSFN region spans first one or two OFDM symbols, and its length is given by Table 5. The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

The PCFICH carries a control format indicator (CFI), which indicates any one of values of 1 to 3. For a downlink system bandwidth $N^{DL}_{RB} > 10$, the number 1, 2 or 3 of OFDM symbols which are spans of DCI carried by the PDCCH is given by the CFI. For a downlink system bandwidth $N^{DL}_{RB} \leq 10$, the number 2, 3 or 4 of OFDM symbols which are spans of DCI carried by the PDCCH is given by CFI+1. The CFI is coded in accordance with the following Table.

TABLE 6

| CFI | CFI code word $<b_0, b_1, \ldots, b_{31}>$ |
|---|---|
| 1 | <0,1,1,0,1,1,0,1,1,0,1,1,0,1,1,0,1,1,0,1,1,0,1,1,0,1,1,0,1,1,0,1> |
| 2 | <1,0,1,1,0,1,1,0,1,1,0,1,1,0,1,1,0,1,1,0,1,1,0,1,1,0,1,1,0,1,1,0> |
| 3 | <1,1,0,1,1,0,1,1,0,1,1,0,1,1,0,1,1,0,1,1,0,1,1,0,1,1,0,1,1,0,1,1> |
| 4(Reserved) | <0,0,0,0,0,0,0,0,0,0,0,0,0,0,0,0,0,0,0,0,0,0,0,0,0,0,0,0,0,0,0,0> |

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

TABLE 7

| DCI format | Description |
|---|---|
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

Other DCI formats in addition to the DCI formats defined in Table 7 may be defined.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode.

For example, a transmission mode is semi-statically configured for the UE by a higher layer so that the UE may receive a PDSCH transmitted in accordance with one of a plurality of transmission modes which are previously defined. The UE attempts to decode a PDCCH using DCI formats only corresponding to its transmission mode. In other words, in order to maintain UE operation load according to blind decoding attempt, at a certain level or less, all DCI formats are not searched by the UE at the same time. Table 8 illustrates transmission modes for configuring multi-antenna technology and DCI formats for allowing a UE to perform blind decoding at the corresponding transmission mode. Particularly, Table 8 illustrates a relation between PDCCH and PDSCH configured by C-RNTI (Cell RNTI (Radio Network Temporary Identifier)).

TABLE 8

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2C | UE specific by C-RNTI | Up to 8 layer transmission, ports 7-14 or single-antenna port, port 7 or 8 |
| Mode 10 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2D | UE specific by C-RNTI | Up to 8 layer transmission, ports 7-14 or single antenna port, port 7 or 8 |

Although transmission modes 1 to 10 are listed in Table 8, other transmission modes in addition to the transmission modes defined in Table 8 may be defined.

Referring to Table 8, a UE configured to a transmission mode 9, for example, tries to decode PDCCH candidates of a UE-specific search space (USS) to a DCI format 1A, and tries to decode PDCCH candidates of a common search space (CSS) and the USS to a DCI format 2C. The UE may decode a PDSCH in accordance with DCI based on the DCI format successfully decoded. If DCI decoding from one of a plurality of PDCCH candidates to the DCI format 1A is successfully performed, the UE may decode the PDSCH by assuming that up to 8 layers from antenna ports 7 to 14 are transmitted thereto through the PDSCH, or may decode the PDSCH by assuming that a single layer from the antenna port 7 or 8 is transmitted thereto through the PDSCH.

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PCFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs, where a search space $S^{(L)}_k$ at aggregation level $L \in \{1,2,4,8\}$ is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The following table shows an example of aggregation levels for defining SS.

TABLE 9

| Type | Search space $S^{(L)}_k$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

For each serving cell on which PDCCH is monitored, the CCEs corresponding to PDCCH candidates m of the search space $S^{(L)}_k$ are configured by "L*{$Y_k$+m') mod floor ($N_{CCE,k}$/L)+i", where i=0, ..., L−1. For the common search space m'=m. For the PDCCH UE specific search space, for the serving cell on which PDCCH is monitored, if the monitoring UE is configured with carrier indicator field then m'=m+$M^{(L)}$*$n_{CI}$ where $n_{CI}$ is the carrier indicator field (CIF) value, else if the monitoring UE is not configured with carrier indicator field then m'=m, where m=0, 1, ..., $M^{(L)}$−1. $M^{(L)}$ is the number of PDCCH candidates to monitor at aggregation level L in the given search space. The carrier indication field value can be the same as a serving cell index (ServCellIndex). For the common search space, $Y_k$ is set to 0 for the two aggregation levels L=4 and L=8. For the UE-specific search space $S^{(L)}_k$ at aggregation level D, the variable $Y_k$ is defined by "$Y_k$=(A·$Y_{k-1}$) mod D", where $Y_{-1}$=$n_{RNTI}$≠0, A=39827, D=65537 and k=floor($n_s$/2). $n_s$ is the slot number within a radio frame.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

FIG. 5 illustrates the structure of a UL subframe used in a wireless communication system.

Referring to FIG. 5, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC).

For example, three 20 MHz CCs may be aggregated on each of a UL and a DL to support a bandwidth of 60 MHz. The respective CCs may be contiguous or noncontiguous in the frequency domain. For convenience, although it has been described that the bandwidth of UL CC and the bandwidth of DL CC are the same as each other and symmetric to each other, the bandwidth of each CC may be independently determined. Asymmetrical carrier aggregation in which the number of UL CCs is different from the number of DL CCs may be implemented. DL/UL CC limited to a specific UE may be referred to as a serving UL/DL CC configured for the specific UE.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is fully reconfigured will be referred to as Pcell, and a cell which may be activated/deactivated freely by the eNB will be referred to as Scell. The Pcell and the Scell may be discriminated from each other on the basis of the control information. For example, specific control information may be set to be transmitted and received through a specific cell only. This specific cell may be referred to as the Pcell, and the other cell(s) may be referred to as Scell(s).

A configured cell refers to a cell in which carrier aggregation is performed for a UE based on measurement report from another eNB or UE among cells of an eNB and is configured per UE. The cell configured for the UE may be a serving cell in terms of the UE. For the cell configured for the UE, i.e. the serving cell, resources for ACK/NACK transmission for PDSCH transmission are reserved in advance. An activated cell refers to a cell configured to be actually used for PDSCH/PUSCH transmission among cells configured for the UE and CSI reporting and SRS transmission for PDSCH/PUSCH transmission are performed in the activated cell. A deactivated cell refers to a cell configured not to be used for PDSCH/PUSCH transmission by the command of an eNB or the operation of a timer and, if a cell is deactivated, CSI reporting and SRS transmission are also stopped in the cell.

For reference, a carrier indicator (CI) denotes a serving cell index (ServCellIndex), CI=0 is applied to Pcell. The serving cell index is a short ID used to identify a serving cell. For example, any one of integers from 0 to 'maximum number of carrier frequencies which can be configured for the UE at a time −1' may be allocated to one serving cell as the serving cell index. That is, the serving cell index may be a logical index used to identify a specific serving cell among cells allocated to the UE rather than a physical index used to identify a specific carrier frequency among all carrier frequencies.

Meanwhile, the 3GPP LTE-A standard uses the concept of a cell to manage radio resources.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the contrary, since a plurality of serving cells may be configured in a multi-carrier system, transmission of UL/DL grant through a serving cell having a good channel status may be allowed. In this way, if a cell carrying UL/DL grant which is scheduling information is different from a cell where UL/DL transmission corresponding to the UL/DL grant is performed, this will be referred to as cross-carrier scheduling.

Hereinafter, the case where the cell is scheduled from itself and the case where the cell is scheduled from another cell will be referred to as self-CC scheduling and cross-CC scheduling, respectively.

For data transmission rate enhancement and stable control signaling, the 3GPP LTE/LTE-A may support aggregation of a plurality of CCs and a cross carrier-scheduling operation based on the aggregation.

If cross-carrier scheduling (or cross-CC scheduling) is applied, a PDCCH for downlink allocation for a DL CC B or DL CC C, that is, carrying a DL grant may be transmitted through a DL CC A, and a corresponding PDSCH may be transmitted through the DL CC B or DL CC C. For cross-CC scheduling, a carrier indicator field (CIF) may be introduced. The presence or absence of the CIF within the PDCCH may be semi-statically and UE-specifically (or UE-group-specifically) configured by higher layer signaling (e.g., RRC signaling).

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH).

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that (those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port $p \in \{107,108,109,110\}$ as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signalling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE shall monitor a set of EPDCCH candidates on one or more activated serving cells as configured by higher layer signaling for control information.

The set of EPDCCH candidates to monitor are defined in terms of EPDCCH UE-specific search spaces. For each serving cell, the subframes in which the UE monitors EPDCCH UE-specific search spaces are configured by higher layers.

An EPDCCH UE-specific search space $ES^{(L)}_k$ at aggregation level $L \in \{1,2,4,8,16,32\}$ is defined by a set of EPDCCH candidates.

For an EPDCCH-PRB-set p, the ECCEs corresponding to EPDCCH candidate m of the search space $ES^{(L)}_k$ are given by the following equation.

$$L\left\{\left(Y_{p,k} + \left\lfloor \frac{m \cdot N_{ECCE,p,k}}{L \cdot M^{(L)}_p} \right\rfloor + b\right) \mod \lfloor N_{ECCE,p,k}/L \rfloor \right\} + i \qquad \text{[Math. 1]}$$

where i=0, . . . , L−1. b=$n_{CI}$ if the UE is configured with a carrier indicator field for the serving cell on which EPDCCH is monitored, otherwise b=0. no is the carrier indicator field (CIF) value, which is the same as a serving cell index (ServCellIndex). m=0, 1, . . . , $M^{(L)}_p$−1, $M^{(L)}_p$ is the number of EPDCCH candidates to monitor at aggregation level L in EPDDCH-PRB-set p. The variable $Y_{p,k}$ is defined by '$Y_{p,k}=(A_p \cdot Y_{p,k-1}) \mod D$', where $Y_{p,-1}=n_{RNTI}\neq 0$, $A_0=39827$, $A_0=39829$, D=65537 and k=floor($n_s/2$). $n_s$ is the slot number within a radio frame.

A UE is not expected to monitor an EPDCCH candidate, if an ECCE corresponding to that EPDCCH candidate is mapped to a PRB pair that overlaps in frequency with a transmission of either PBCH or PSS/SSS in the same subframe.

An EPDCCH is transmitted using an aggregation of one or several consecutive enhanced control channel elements (ECCEs). Each ECCE consists of multiple enhanced resource element groups (EREGs). EEREGs are used for defining the mapping of enhanced control channels to resource elements. There are 16 EREGs, numbered from 0 to 15, per physical resource block (PRB) pair. Number all resource elements (REs), except resource elements carrying DMRS (hereinafter EPDCCH DMRS) for demodulation of the EPDCCH, in a physical resource-block pair cyclically from 0 to 15 in an increasing order of first frequency, then time. Therefore all the REs, except REs carrying the EPDCCH DMRS, in the PRB pair has any one of numbers 0 to 15. All REs with number i in that PRB pair constitutes EREG number i. As described above, it is noted that EREGs are distributed on frequency and time axes within the PRB pair and an EPDCCH transmitted using aggregation of one or more ECCEs, each of which includes a plurality of EREGs, is also distributed on frequency and time axes within the PRB pair.

The number of ECCEs used for one EPDCCH depends on the EPDCCH format as given by Table 10, the number of EREGs per ECCE is given by Table 11. Table 10 shows an example of supported EPDCCH formats, and Table 11 shows an example of the number of EREGs per ECCE, $N^{EREG}_{ECCE}$. Both localized and distributed transmission is supported.

TABLE 10

| | Number of ECCEs for one EPDCCH, $N^{ECCE}_{EPDCCH}$ | | | |
|---|---|---|---|---|
| | Case A | | Case B | |
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

TABLE 11

| Normal cyclic prefix | | Extended cyclic prefix | |
|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

An EPDCCH can use either localized or distributed transmission, differing in the mapping of ECCEs to EREGs and PRB pairs. One or two sets of PRB pairs which a UE shall monitor for EPDCCH transmissions can be configured. All EPDCCH candidates in EPDCCH set $S_p$ (i.e., EPDCCH-PRB-set) use either only localized or only distributed transmission as configured by higher layers. Within EPDCCH set $S_p$ in subframe k, the ECCEs available for transmission of EPDCCHs are numbered from 0 to $N_{ECCE,p,k}-1$. ECCE number n is corresponding to the following EREG(s):

EREGs numbered (n mod $N^{ECCE}_{RB}$)+$jN^{ECCE}_{RB}$ in PRB index floor(n/$N^{ECCE}_{RB}$) for localized mapping, and EREGs numbered floor (n/$N^{Sm}_{RB}$)+$jN^{ECCE}_{RB}$ in PRB indices (n+jmax(1,$N^{Sp}_{RB}/N^{EREG}_{ECCE}$))mod $N^{Sp}_{RB}$ for distributed mapping, where j=0, 1, ..., $N^{EREG}_{ECCE}-1$, $N^{EREG}_{ECCE}$ is the number of EREGs per ECCE, and $N^{ECCE}_{RB}=16/N^{ERG}_{ECCE}$ is the number of ECCEs per RB pair. The PRB pairs constituting EPDCCH set $S_p$ are assumed to be numbered in ascending order from 0 to $N^{Sp}_{RB}-1$.

Case A in Table 10 applies when:

DCI formats 2, 2A, 2B, 2C or 2D is used and $N^{DL}_{RB} \geq 25$, or any DCI format when $n_{EPDCCH}<104$ and normal cyclic prefix is used in normal subframes or special subframes with configuration 3, 4, 8.

Otherwise case B is used. The quantity $n_{EPDCCH}$ for a particular UE is defined as the number of downlink resource elements (k,l) in a PRB pair configured for possible EPDCCH transmission of EPDCCH set $S_0$ and fulfilling all of the following criteria, they are part of any one of the 16 EREGs in the physical resource-block pair, they are assumed by the UE not to be used for CRSs or CSI-RSs, the index l in a subframe fulfils $l \geq l_{EPDCCHStart}$.

where $l_{EPDCCHStart}$ is given based on higher layer signaling 'epdcch-StartSymbol-r11', higher layer signaling 'pdsch-Start-r11', or CFI value carried by PCFICH.

The mapping to resource elements (k,l) on antenna port p meeting the criteria above is in increasing order of first the index k and then the index l, starting with the first slot and ending with the second slot in a subframe.

For localized transmission, the single antenna port p to use is given by Table 12 with n'=$n_{ECCE,low}$ mod $N^{ECCE}_{RB}$+ $n_{RNTI}$ mod min($N^{ECCE}_{EPDCCH}$,$N^{ECCE}_{RB}$), where $n_{ECCE,low}$ is the lowest ECCE index used by this EPDCCH transmission in the EPDCCH set, $n_{RNTI}$ corresponds to the RNTI associated with the EPDCCH transmission, and $N^{ECCE}_{EPDCCH}$ is the number of ECCEs used for this EPDCCH.

TABLE 12

| | Normal cyclic prefix | | Extended cyclic prefix |
|---|---|---|---|
| n' | Normal subframes, Special subframes, configurations 3, 4, 8 | Special subframes, configurations 1, 2, 6, 7, 9 | Any subframe |
| 0 | 107 | 107 | 107 |
| 1 | 108 | 109 | 108 |
| 2 | 109 | — | — |
| 3 | 110 | — | — |

For distributed transmission, each resource element in an EREG is associated with one out of two antenna ports in an alternating manner where $p \in \{107,109\}$ for normal cyclic prefix and $p \in \{107,108\}$ for extended cyclic prefix.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

FIG. 6 illustrates an example of signals band for MTC.

As one method for reducing the cost of the MTC UE, an operation of the MTC UE may be performed at a reduced UE downlink and uplink bandwidth of 1.4 MHz, for example, regardless of an operating system bandwidth of a cell. At this time, a subband (narrowband) for operating the MTC UE may always be located at the center (e.g., 6 center PRBs) of a cell as shown in FIG. 6(*a*), or several subbands for MTC may be provided for one subframe to multiplex MTC UEs as shown in FIG. 6(*b*), whereby the UEs may use their respective subbands different from each other or the UEs use the same subband not the subband of 6 center PRBs.

In this case, the MTC UE cannot receive a legacy PDCCH transmitted through a full system band normally, and transmission of PDCCH for the MTC UE from an OFDM symbol region within which the legacy PDCCH is transmitted may not be preferable due to multiplexing issue with a PDCCH transmitted to another UE. As one method for solving this, it is required to introduce a control channel transmitted within a subband where MTC is operated for the MTC UE. As a downlink control channel for such a low-complexity MTC UE, the legacy EPDCCH may be used as it is. Or, M-PDCCH for the MTC UE which is a control channel of a modified type of the legacy PDCCH/EPDCCH may be introduced. Hereinafter, in the present invention, the legacy EPDCCH or M-PDCCH for the low-complexity MTC UE or normal complexity MTC UE will be referred to as M-PDCCH. Also, MTC-EPDCCH is hereinafter used to refer to M-PDCCH.

A data channel (e.g., PDSCH, PUSCH) and/or a control channel (e.g., M-PDCCH, PUCCH, PHICH) may be transmitted for coverage enhancement (CE) of the UE by using a repetition or TTI bundling scheme through multiple subframes. The control/data channel may be transmitted by additionally using cross-subframe channel estimation and frequency (narrowband) hopping for CE. In this case, cross-subframe channel estimation means a channel estimation method means channel estimation using a reference signal within a subframe of a corresponding channel and a reference signal within neighboring subframe(s).

The MTC UE may need CE of 15 dB, for example. However, all MTC UEs do not exist in an environment that CE is needed. Also, the same requirements of QoS are not applied to all MTC UEs. For example, since devices such as sensor and meter have low mobility and are likely to be located in a shaded area even while having a small amount of data transmission and reception, the devices may need high CE. However, wearable devices such as smart watch may have mobility and are likely to be located in a place not a shaded area while having a relatively large amount of data transmission and reception. Therefore, all MTC UEs do not need CE of high level, and their requirement capability may be varied depending on their type.

In the present invention, an operation for monitoring M-PDCCH by means of an MTC UE (which needs coverage enhancement (CE)) will be suggested. Hereinafter, M-PDCCH monitoring, search space monitoring, or M-PDCCH candidates monitoring may mean that reception or detection of M-PDCCH is attempted within a corresponding search space or from one of M-PDCCH candidates configuring the corresponding search space.

In the following embodiments, the expression "assume" may mean that an entity for transmitting a channel transmits the channel to be suitable for the corresponding "assumption". An entity for receiving the channel may receive or decode the channel to be suitable for the corresponding "assumption" provided that the channel has been transmitted to be suitable for the corresponding "assumption".

FIG. 7 illustrates repeated transmission of a channel for coverage enhancement.

A search space for M-PDCCH may be configured over a plurality of downlink subframes. For example, M-PDCCH search space having an aggregation level L and a repetition level R is defined by a set of M-PDCCH candidates. In this case, each M-PDCCH candidate may be repeated within a set of R number of consecutive downlink subframes. Referring to FIG. 7, in an example of maximum repetitions $R_{max}=8$ and a possible repetition level of $R \in \{1, 2, 4, 0\}$, a UE may attempt decoding of M-PDCCH by assuming that repetition of M-PDCCH (transmitted at an aggregation level L) exists in each of R number of consecutive downlink subframes. For example, the UE may attempt decoding of M-PDCCH by regarding signals received from each of 8 subframes as those of the same M-PDCCH in case of a repetition level R=8 and attempt decoding of different M-PDCCHs in each of 8 subframes in case of a repetition level R=1.

In FIG. 7, repetition of a channel is performed over consecutive downlink subframes. However, a data channel and/or a control channel (hereinafter, data/control channel) transmitted to/from the MTC UE which needs CE may be transmitted by being repeated through non-consecutive subframes. For example, the control/data channel for a specific MTC UE may not be in all downlink subframes but may be restricted to some downlink subframes. Non-consecutive downlink subframes available at the MTC UE may be configured in such a manner that a downlink subframe group comprised of one or more consecutive downlink subframes is repeated with a periodicity greater than the number of subframes within the downlink subframe group. In other words, the data/control channel may be transmitted not in physically consecutive subframes, but transmitted in transmitted in each of physically non-consecutive subframes (excluding uplink subframes in case of downlink transmission, downlink subframes in case of uplink transmission, and/or subframes except subframe used for other purpose of use and cannot be used for data/control channel transmission). Use of non-consecutive (downlink or uplink) subframes for repeated transmission of the data/control channel of the MTC UE may increase transmission/reception latency. However, as time diversity effect is obtained in the time domain by use of non-consecutive subframes, the number of repetitions or the number of subframes used for channel transmission may be reduced as compared with transmission based on consecutive subframes. Therefore, overall system throughput may be increased. The embodiments of the present invention, which will be described later, suggest UE operation and transmission subframe during transmission/reception of a corresponding channel when a data/control channel transmitted from MTC UE is transmitted with repetition through consecutive subframes or non-consecutive subframes.

In the following embodiments, each search space within an interval where a UE monitors M-PDCCH (CSS and/or USS) may be configured over one or more (consecutive or non-consecutive) downlink subframes. That is, a search space for reception of the same M-PDCCH may be configured in each of one or more downlink subframes.

For example, referring to FIG. 8, in case of no CE or CE having a repetition level=1, each of CSSs of FIG. 8 may be CSS on which a respective M-PDCCH can be transmitted. At this time, a CSS starting subframe may mean a first subframe of paging occasions for allowing a UE to monitor M-PDCCH for a paging message. As another example, referring to FIG. 9, in case of no CE or CE having a repetition level=1, each of CSSs of FIG. 9 may be CSS on which a respective M-PDCCH can be transmitted. At this time, a CSS starting subframe may mean a first subframe of a RAR window for allowing a UE to monitor M-PDCCH for scheduling RAR.

In case of coverage enhancement (CE), M-PDCCH may be transmitted by being repeated once or multiple times. Therefore, a search space where M-PDCCH (hereinafter, paging M-PDCCH) will be monitored may be configured repeatedly over a plurality of downlink subframes, and a UE may attempt repeated reception of M-PDCCH within search spaces within the plurality of downlink subframes. If CE having a repetition level greater than 1 is applied, for example, each CSS shown in FIG. 8 may be a plurality of consecutive subframes that may have repetitions of M-PDCCH. If CE having a repetition level greater than 1 is applied, as another example, a plurality of CSSs within the same paging occasion shown in FIG. 8 may be CSSs for repetitions of the same M-PDCCH. If CE having a repetition level greater than 1 is applied, as still another example, a plurality of CSSs over a plurality of paging occasions shown in FIG. 8 may be CSSs for repetitions of the same M-PDCCH.

Section 1. M-PDCCH CSS for Paging Message Scheduling

In Section 1, details on M-PDCCH CSS for paging message scheduling are discussed.

The paging message is used to notify UE(s) under RRC_IDLE and UE(s) under RRC_CONNECTED of system information modification.

An eNB initiates a paging process by transmitting the paging message at a paging occasion of a UE. The eNB may address a plurality of UEs within the paging message by including a paging record (PagingRecord) per UE. The paging record may include information indicating NAS (non-access stratum) identifier of a UE which is paged and information indicating the origin of paging. One paging occasion means a subframe having P-RNTI transmitted on PDCCH/M-PDCCH addressing the paging message. A paging frame (PF) means one radio frame that includes one or a plurality of paging occasion(s).

The UE may use discontinuous reception (DRX) in an idle mode to reduce power consumption. If DRX is used, the UE monitors only one paging occasion per DRX cycle.

The paging message may be transmitted through a PDSCH, and the PDSCH carrying the paging message may be scheduled by PDCCH/M-PDCCH.

For paging message scheduling, multiple narrowbands can be configured by eNB. Then, a narrowband location for a paging occasion monitoring of a UE is determined by at least UE ID at least for paging record(s). However, the narrowband location and paging occasion for common signal transmission (e.g., SI update, earthquake and tsunami warning system (ETWS), and/or commercial mobile alert system (CMAS)) is not determined yet. To reduce UE complexity, it would be beneficial to apply the same paging occasion and narrowband location for paging record(s) reception and other information reception such as SI update, ETWS, and CMAS. For example, the UE may attempt reception of M-PDCCH for scheduling the paging message on the same narrowband at the same paging occasion for SI update and reception of ETWS and CMAS instead of monitoring different paging occasions and/or different narrowbands for SI update and reception of ETWS and CMAS.

FIG. 8 illustrates a configuration of a common search space (CSS) for paging according to the present invention.

Under the assumption that a paging occasion is a time region for M-PDCCH monitoring for paging message scheduling, a UE can monitor a common search space (CSS) within a paging occasion to check paging message transmission. Depending on duration of paging occasion and period of CSS starting subframe, there can be multiple CSS monitoring opportunities within a paging occasion as shown in FIG. 8. The period and offset of CSS starting subframe location can be configured by eNB. In this case, offset $k_{offset}$ of the CSS starting subframe may mean a difference from a reference subframe n (e.g., subframe 0) to a subframe $n+k_{offset}$ in which the CSS starting subframe is first applied.

The composition of decoding candidates (i.e. M-PDCCH candidates) and a subset of $\{L, R\}$ for CSS for paging should be composed to supports all UEs with different CE levels. In this case, L indicates an aggregation level, and M-PDCCH of the aggregation level L is transmitted using aggregation of L number of M-CCEs. ECCE may be used as M-CCE, and CCE for MTC UE may newly be defined as M-CCE for MTC UE.

To transmit paging message adapt to the target CE level, a subset of $\{L, R\}$ of CSS for paging needs to be composed to cover all range of CE levels or all range of repetition numbers. One simple configuration is $\{8, R1\}$, $\{16, R1\}$, $\{24, R1\}$, $\{24, R2\}$, $\{24, R3\}$, $\{24, R4\}$ where R1=1 and R4 is the maximum repetition level.

In the present invention, a paging occasion may be defined as an interval where a UE monitors a paging M-PDCCH. For example, the UE may attempt reception of (same) paging M-PDCCH (or M-PDCCH scrambled by P-RNTI) within CSS(s) existing in the paging occasion or paging M-PDCCH search space(s) as shown in FIG. 8. Since the paging M-PDCCH may be transmitted in any one of CSS(s) within the paging occasion, the UE continuously monitors the CSS(s) within the paging occasion. If the paging M-PDCCH (or M-PDCCH scrambled by P-RNTI) is received within the corresponding interval, the UE may receive a PDSCH carrying the corresponding paging message even though a paging message scheduled by the corresponding M-PDCCH, that is, a PDSCH carrying paging is transmitted outside a paging occasion interval.

A duration of the paging occasion may be configured to be a multiple of the number of subframes configuring CSSs or search spaces on which the paging M-PDCCH is transmitted. For example, if the paging M-PDCCH search space is configured in each of R number of (consecutive or non-consecutive) downlink subframes, the paging occasion may be configured to have a duration of R*X number of subframes (where X is a positive integer).

Section 2. M-PDCCH CSS for RAR Scheduling

FIG. 9 illustrates a configuration of a common search space (CSS) for RAR according to the present invention.

There would be multiple narrowbands for CSS for RAR scheduling, and the narrowband location of a UE for RAR monitoring is determined by PRACH resource set.

After transmitting PRACH, a UE would try to receive RAR. Similar to paging occasion, there can be multiple CSS regions within a RAR window as depicted in FIG. 9. So, the UE can monitor M-PDCCH scheduling RAR in CSS region(s) within the RAR window.

A subset of $\{L, R\}$ and composition of decoding candidates of CSS for RAR can depend on CE level of corresponding PRACH resource set. For example, for each CE level, PRACH resource set(s) and available repetition level(s) may be configured. In this case, the UE may monitor a CSS, that is, M-PDCCH in accordance with a set of {L, R} configured for a CE level associated with a PRACH resource used for a successful RACH procedure. Regardless of CSS and USS, same composition of decoding candidates and same subset of {L, R} can be used for same CE level of the search space. For example, the UE may monitor a CSS and a USS in accordance with {L, R} of the same set with respect to the same CE level.

The present invention suggests that a RAR window interval should be defined as an interval where a UE monitor M-PDCCH (hereinafter, RAR M-PDCCH) for scheduling RAR. That is, as shown in FIG. 9, the UE may attempt reception of RAR M-PDCCH (e.g., M-PDCCH scheduled by RA-RNTI) on CSS(s) existing within a RAR window or a search space(s) (hereinafter, RAR M-PDCCH search space) on which RAR M-PDCCH is transmitted. If the UE receives RAR M-PDCCH within the corresponding interval, the UE may receive a PDSCH through which the corresponding RAR is transmitted, even though RAR (e.g., PDSCH carrying RAR) scheduled by the corresponding M-PDCCH is transmitted outside the RAR window interval.

A duration of the RAR window may be configured to become a multiple of the number of subframes configuring CSSs or RAR M-PDCCH search spaces. For example, if RAR M-PDCCH search space is configured in each of R number of (consecutive or non-consecutive) downlink subframes, the RAR window may be configured to have a duration of R*X number of subframes (in this case, X is a positive integer).

Section 3. M-PDCCH CSS for Other Purposes

M-PDCCH CSS can be used to transmit DCIs for other purposes except paging message and RAR scheduling. For example, M-PDCCH CSS can be used for transmission of DCI for unicast data, DCI for TPC, DCI for enhanced interference management and traffic adaptation (eIMTA), and DCI for enhanced PHICH (EPHICH). If CSS is used to transmit these DCIs, the narrowband location, monitoring subframe location, and decoding candidates composition need to be specified. Hereinafter, the CSS will be referred to as CSS_regular or CSS_others.

CSS for these purposes (i.e. CSS_regular) can be located in the same narrowband to USS. Then, a UE does not need to re-tune its operating frequency to monitor this CSS.

To reconfigure CE level of a UE, the CSS needs to support the maximum CE level of the cell considering CE level reconfiguration message can be transmitted by this CSS. Therefore, CE level or a subset of {L, R} composing the CSS should support all CE level of the cell.

FIG. 10 illustrates the example of the monitoring time region of USS and CSS.

Period of starting subframe for M-PDCCH USS monitoring and CSS monitoring can be configured independently. The period of CSS monitoring can be longer than the period of USS, since CE level of USS and CSS can be different and CSS can be occurred sparsely to reduce UE complexity.

Referring to Math FIG. 1 which is a hashing function, it is noted that $Y_{p,k}$ is varied depending on $n_{RNTI}$ which is UE ID. In this way, CCE(s) or ECCE(s) configuring decoding candidates in the USS is(are) determined UE-specifically to be monitored by a specific UE. M-PDCCH CSS can be monitored by a group of MTC UEs. Therefore, for CSS, there should not be a hashing function to randomize the starting ECCE location composing a search space UE-specifically.

Section 4. Coverage Enhancement Level of CSS

For transmission of a broadcast PDSCH (e.g., paging, RAR), CSSs for other purposes such as unicast data, TPC, eIMTA DCI and EPHICH may exist, and USS where a UE monitors unicast data may exist. Hereinafter, a coverage enhancement level of corresponding search spaces will be described.

The present invention suggests that a plurality of SS types exist as follows in accordance with a coverage enhancement level supported by a search space or repetitions of M-PDCCH.

Method 1.

In view of the UE, two types of search spaces (SSs) may exist as follows:

SS type 1: SS supporting all coverage enhancement levels or all repetitions of M-PDCCH, and SS type 2: SS where the number of repetitions of M-PDCCH which is supported is varied depending on a coverage enhancement level of the UE.

In this case, the UE may assume that CSS for paging and/or CSS_regular has SS type 1, and CSS and/or USS for RAR has SS type 2.

Alternatively, as SS monitored by the UE, one SS having SS type 1 and one SS having SS type 2 may exist. CSS for paging and/or CSS_regular may be the same as SS having SS type 1, and CSS and/or USS for RAR may be the same as SS having SS type 2.

Method 2.

When N number of coverage enhancement levels (or the number of repetitions of M-PDCCH) supported by a cell exist, in view of the cell, a plurality of SS types may exist as follows:

SS type 1: SS supporting coverage enhancement level 1 (or the number of repetitions $R_1$ of M-PDCCH), SS type 2: SS supporting coverage enhancement level 2 (or the number of repetitions $R_2$ of M-PDCCH),

. . .

SS type N: SS supporting coverage enhancement level N (or the number of repetitions RN of M-PDCCH), SS type N+1: SS supporting all coverage enhancement levels (or all repetitions for M-PDCCH).

In this case, SS supporting the coverage enhancement level n may mean SS supporting the coverage enhancement levels 1 to n or the maximum number of repetitions $R_n$ of M-PDCCH.

In this case, the UE may assume that the CSS for paging and CSS_regular has SS type N+1, and the CSS for RAR and/or USS has SS type k if the coverage enhancement level of the UE is k.

Section 5. Relationship Between Search Spaces

CSS for Paging (i.e., CSS_Paging)

It is a CSS for paging monitoring in RRC_IDLE state. Since UEs in different CE levels monitor the same CSS for paging scheduling, it should be designed to cover all the CE levels. CSS_paging are configured by SIB. In other words, the configuration of CSS_paging may be transmitted through SIB. The UE may identify the configuration of CSS_paging by reading SIB. The UE may monitor M-PDCCH candidates of CSS within subframe(s) and/or narrowband(s) according to the CSS_paging configuration.

CSS for RAR Corresponding to Initial RACH Procedure (i.e., CSS_RAR)

Using CSS for RAR, a UE can monitor RAR, Msg3 (for retransmission), and Msg4. Though it can be considered to allow separate SS configurations for Msg3 retransmission and Msg4 scheduling M-PDCCH from the SS configuration for RAR, given that those (i.e. RAR, Msg3 and Msg4) will be used only for initial access, the present invention proposes that the same configuration is used for initial RACH procedure. Required configurations for CSS_RAR can be configured by SIB per CE level. Then, in a UE perspective, configurations for CSS_RAR can be determined based on the CE level of PRACH resource set used for the latest PRACH transmission.

CSS for Others (i.e., CSS_Others or CSS_Regular)

M-PDCCH CSS can be used to transmit DCIs for other purposes except paging message and initial RAR scheduling. For example, CSS is required to transmit TPC, unicast data for reconfiguration (such as CE level, transmission mode, USS reconfiguration), a DCI transmitting multiple HARQ-ACK corresponding to PUSCH to multiple UEs (if supported), transmit RAR corresponding to PRACH triggered by M-PDCCH order. CSS for these purposes can be located in the same narrowband to USS once a UE is connected to the network. Then, a UE does not need to re-tune its operating frequency to monitor this CSS. A UE can monitor CSS_others (i.e., CSS_regular) and USS simultaneously.

If there is a complexity issue, TDM of CSS and USS monitoring can be considered. In other words, CSS and USS are time-division multiplexed, whereby the CSS and the USS may not be monitored at the same time.

If CSS for other purposes are not defined, legacy PUCCH TPC via DCI format 3/3A cannot be supported. Then, if downlink traffic is occurred sparsely, it could be difficult to adopt PUCCH power since PUCCH TPC is accomplished by accumulated way. So, other way to handle this issue needs to be considered such as absolute PUCCH TPC via DL grant or unicast DCI for PUCCH TPC transmitted by USS. Thus, at least for CE mode A (for $T_{CP}$ and reconfiguration), CSS_others needs to be supported.

USS

USS is a search space for unicast data scheduling. Configurations for USS can be configured by SIB and Msg4. If necessary, reconfiguration can be utilized by radio resource control (RRC) layer (i.e. RRC signal). Configurations for USS also can be applied for CSS_others. In this case, individual configurations for CSS_others and USS may not be required.

FIG. 11 illustrates a procedure of configuring a search space according to the present invention.

Referring to FIG. 11, the UE may receive a list of search space (SS) configurations per CE level for RAR through SIB (S1101). The UE may transmit RACH preamble through PRACH by using a PRACH resource. PRACH resource(s) per CE level may be configured by SIB. The UE may monitor M-PDCCH for scheduling a response to the RACH preamble transmitted therefrom, that is, a response to transmission of the PRACH in a search space (S1103). The UE may assume that a search space for M-PDCCH scheduling the RAR depends on SS configuration (e.g., CSS_RAR configuration) received through the SIB. The UE which has received RAR M-PDCCH may receive RAR in accordance with DCI carried by the RAR M-PDCCH (S1105).

Initial configuration for RAR, Msg3 and/or Msg4 may depend on SS configuration per CE level received (S1101) through SIB (S1121). The UE may monitor M-PDCCH for scheduling Msg4, which includes CSS configuration/reconfiguration and/or USS configuration/reconfiguration parameters, in the SS according to initial configuration through SIB (S1121). For example, the UE may monitor Msg4 M-PDCCH by assuming that the maximum number of repetitions, narrowband, PRB-set, etc. which are the same as those of CSS for RAR, are also applied to M-PDCCH (hereinafter, Msg4 M-PDCCH) for scheduling Msg4 (S1121). The UE which has received Msg4 M-PDCCH may receive Msg4 in accordance with DCI of the Msg4 M-PDCCH (S1123). The Msg4 may carry RRC message that includes UE-specific configuration for USS and/or CSS. In this case, the UE may monitor M-PDCCH by applying the UE-specific SS configuration instead of initial SS configuration (S1125).

The UE may monitor M-PDCCH order within the CSS according to the UE-specific CSS configuration (S1141). The UE which has received the M-PDCCH order may receive RAR in accordance with scheduling information carried by the M-PDCCH order (S1143).

The UE may monitor M-PDCCH for scheduling RRC message having UE-specific reconfiguration parameter(s) within the CSS according to the UE-specific CSS configuration (S1161). The UE-specific reconfiguration may include M-PDCCH configuration. The UE which has received the M-PDCCH may receive a PDSCH carrying the RRC message in accordance with scheduling information (that is, DCI) of the M-PDCCH (S1163). The UE may reconfigure M-PDCCH search space in accordance with the UE-specific reconfiguration.

Table 13 illustrates parameters and configuration details required for search spaces. All or some of the parameters illustrated in Table 13 may be configured and/or reconfigured in accordance with Table 13.

TABLE 13

| Parameters | Configuration details | | | | Description |
|---|---|---|---|---|---|
| | CSS_paging | CSS_RAR | CSS_others | USS | |
| Subset of L | | Fixed to {8, 16, 24} | | {1, 2, 4, 8, 16, 24} | |
| $R_{max}$ | Configurable by SIB. | Configured by SIB per CE level (configuration can be shared for CSS_RAR, CSS_others, USS).For CSS_others/USS, it can be reconfigured by RRC. | | | Subset of repetition numbers is determined based on $R_{max}$. Details are described in Subsection 5.1. |
| PRB-sets | Configured by SIB. | Configured by SIB per CE level specific and cell-specific. | | Alt 1. Configured by Msg4 per UE.Alt 2. Configured by SIB per CE level (in this case, same configuration for CSS_RAR, CSS_others, USS).It can be reconfigured by RRC. | This configuration includes the number of PRB-sets, PRB size/ location of each PRB-set. |

TABLE 13-continued

| Parameters | CSS_paging | CSS_RAR | CSS_others USS | Description |
|---|---|---|---|---|
| Transmission type | Configured by SIB per PRB-set. | Configured by SIB per PRB-set. | Alt 1. Configured by Msg4 per UE (the network ensures the same type is used beween CSS_others and USS in case both are monitored at the same time).Alt 2. Configured by SIB per CE level (in this case, same configuration for CSS_RAR, CSS_others, USS).It can be reconfigured by RRC. | |
| Narrowband | Determined by UE ID among paging narrow bands configured by SIB. | Based on PRACH resource set where RAR narrowband corresponding to each PRACH resource set is configured by SIB. | Default value can be CSS_RAR's narrowband location. Configurable by Msg 4 per UEIt can be re-configured by RRC. | |
| M-PDCCH monitoring starting | Alt 1. Configured by SIB per CE level.Alt 2. Configured by SIB regardless of CE level (one maximum value to reset monitoring starting subframe). | | | See FIG. 7 and Subsection 5.1. |
| M-PDCCH starting subframe | Determined by repetition number R per repetition number R. | Alt 1. Determined by $R_{max}$ for CE Mode A, determined by repetition number R per repetition number R for CE Mode B.Alt 2. Determined by repetition number R per repetition number R. | | See FIG. 7 and Subsection 5.1. |

In Table 13, a merged cell means that the configuration can be shared by corresponding search spaces, so individual configuration is not needed for each search space. For example, referring to Table 13, "Fixed to {8, 16, 24}" which is the description of a subset of an aggregation level L exists within a cell merged for CSS_paging, CSS_RAR and CSS_others (i.e., CSS_regular), and thus means that a corresponding parameter is not required to be configured individually for CSS_paging, CSS_RAR and CSS_others (i.e. CSS_regular) and a common parameter is applied to CSS_paging, CSS_RAR and CSS_others. According to Table 13, the UE may attempt reception of M-PDCCH at an aggregation level L∈{8, 16, 24} for CSS_paging, CSS_RAR and CSS_others, and may attempt reception of M-PDCCH at L∈{1, 2, 4, 8, 16, 24} for the USS.

Reconfigurable parameters in Table 13 mean that the same value as initial configuration or default configuration is applied until a corresponding parameter is reconfigured, whereby search space(s) is(are) configured.

For example, referring to Table 13, the maximum number of repetitions $R_{max}$ of M-PDCCH may be provided through SIB as a configuration for CSS_RAR. The UE may monitor CSS_RAR, CSS_others and/or USS by assuming that $R_{max}$ included in the SIB is applied to CSS_RAR, CSS_others, and USS. That is, the UE may monitor repetitions of M-PDCCH in SS within maximum $R_{max}$ number of subframes. According to Table 13, since $R_{max}$ for CSS_others and/or USS (hereinafter, CSS_others/USS) may be reconfigured, if $R_{max}$ for CSS_others/USS is reconfigured by RRC signal, the UE may monitor CSS_others/USS in accordance with the reconfigured $R_{max}$. In other words, the UE may monitor CSS_others/USS in accordance with $R_{max}$ for CSS_RAR until $R_{max}$ for CSS_others/USS is received.

For another example, referring to parameters of PRB-sets in Table 13, PRBs on which PRB-set(s) for CSS_RAR, that is, RAR M-PDCCH may be transmitted may be configured CE level-specifically and cell-specifically by SIB. Referring to Alt 2, these PRB-sets configured per CE level may be applied to CSS_others and USS by SIB. Since PRB-set parameter for CSS_others and USS may be reconfigured by RRC, the UE may monitor CSS_others/USS by applying PRB-set(s) for CSS_RAR until reconfiguration PRB-set parameter for CSS_others/USS is received, and may monitor CSS_others/USS by applying the reconfiguration PRB-set parameter if the reconfiguration PRB-set parameter for CSS_others/USS is received. For example, if PRB-set(s) of CSS_RAR are fixed to 6, the UE may monitor M-PDCCH USS by assuming all PRBs within a narrowband according to CSS_RAR configuration as PRB-set(s) for USS until configuration of separate PRB-set(s) for USS is received.

For still another example, referring to a narrowband parameter of Table 13, a narrowband (hereinafter, RAR narrowband) having CSS_RAR may be determined based on a PRACH resource set. In this case, a corresponding RAR narrowband per PRACH resource set is configured by SIB. A default narrowband location of CSS_others and/or USS may be a narrowband location of CSS_RAR. A narrowband for CSS_others/USS may be configured per UE by Msg4, and may be reconfigured by RRC. Therefore, the UE may monitor CSS_others/USS on the same narrowband as that for CSS_RAR until a narrowband parameter for CSS_others/USS is received, and if Msg4 for CSS_others/USS or reconfiguration RRC message is received, may monitor CSS_others/USS on a narrowband according to the Msg4 or the RRC message.

☐ Subsection 5.1. Aggregation levels and repetition numbers

Search space configuration parameters of Table 13 may be applied as follows in view of an aggregation level and the number of repetitions. For example, a subset (and/or starting subframe of M-PDCCH SS and/or starting subframe of M-PDCCH) of the number of repetitions R based on $R_{max}$ may be determined in accordance with the following description.

CSS for Paging (i.e., CSS_Paging)
Aggregation Levels:
Since data transmission scheduled by CSS is targeted to multicast/broadcast, similar to PDCCH CSS, some high aggregation levels can be supported. Aggregation levels (ALs) {8, 16, 24} can be supported for normal CP and ALs {4, 8, 12} can be supported for extended CP.
Repetition Numbers:
A subset of R for CSS for paging monitoring depends on the maximum R (i.e., $R_{max}$) where $R_{max}$ is configured by SIB. To support wide range of repetition numbers, the subset of R monitored for CSS_paging can be {$R_{max}/64$, $R_{max}/16$, $R_{max}/4$, $R_{max}$}.

CSS for RAR Corresponding to Initial RACH Procedure (i.e., CSS_RAR)
Aggregation Levels:
Similar to CSS_paging, ALs L∈{8, 16, 24} can be supported for normal CP and ALs L∈{4, 8, 12} can be supported for extended CP.
Repetition Numbers:
For CSS scheduling RAR, the subset of R depends on the maximum R (i.e., $R_{max}$) where $R_{max}$ is configured by SIB per CE level. The subset of R monitored for CSS_RAR can be {$R_{max}/4$, $R_{max}/2$, $R_{max}$}.

CSS for Others (i.e., CSS_Others)
Aggregation Levels:
Similar to CSS_paging, ALs L∈{8, 16, 24} can be supported for normal CP and ALs L∈{4, 8, 12} can be supported for extended CP.
Repetition Numbers:
For CSS_others, the subset of R depends on the maximum R (i.e., $R_{max}$) where $R_{max}$ is configured by SIB per CE level or Msg4. $R_{max}$ can be reconfigured by RRC if necessary. The subset of R monitored for CSS_others can be {$R_{max}/4$, $R_{max}/2$, $R_{max}$}. Or, to reduce UE complexity, the subset of R monitored for CSS_others can be {$R_{max}/2$, $R_{max}$}.

USS
Aggregation Levels:
For CE Mode A, ALs L {1, 2, 4, 8, 16, 24} are supported for normal CP. ALs L {1, 2, 4, 8, 12} are supported for extended CP. For CE Mode B, ALs L∈{8, 16, 24} is supported for normal CP. ALs L {4, 8, 12} are supported for extended CP.
Repetition numbers:
For USS, the subset of R depends on the maximum R (i.e., $R_{max}$) where $R_{max}$ is configured by SIB per CE level or Msg4. $R_{max}$ can be reconfigured by RRC if necessary. The subset of R monitored for USS can be {$R_{max}/4$, $R_{max}/2$, $R_{max}$}. Or, to support higher R to CSS_others for CE level reconfiguration reliably, subset of R monitored for USS can be {$R_{max}/8$, $R_{max}/4$, $R_{max}/2$}.

Section 6. Collision of M-PDCCH(s)
If there are some subframes not available for downlink transmission, M-PDCCH/PDSCH transmission or repetitions can be postponed till the next available subframe. It can be applied in case unavailable subframes are aligned between eNB and UE.

FIG. 12 illustrates a configuration of M-PDCCH repeated transmission according to the present invention.

If a small interval (e.g., cycle of starting subframe of M-PDCCH search space) of M-PDCCH search space is configured or a large number of invalid subframes, which cannot have M-PDCCH, are provided between M-PDCCH search space starting subframes, M-PDCCH2 transmission may not end until next starting subframe of the search space, in the same manner as M-PDCCH2 transmission of FIG. 12. That is, the subframes configuring two search spaces may be overlapped with each other. In this case, the UE may be in the status that the UE should perform monitoring for M-PDCCH transmitted in a previous search space and monitoring for M-PDCCH transmitted in a next search space. However, this operation may not be preferable due to buffer size and complexity issue of the UE. In this case, the UE may perform reception of M-PDCCH as follows.

Method 1. If a starting time (hereinafter, subframe #n) of next search space occurs before reception of M-PDCCH is ended, the UE may assume that the M-PDCCH is transmitted up to subframe #n−1 and is not transmitted in subframe #n. In this case, the UE may attempt reception of the M-PDCCH by using repetitions smaller than the number of expected repetitions of M-PDCCH.

Method 2. If a starting time (hereinafter, subframe #n) of next search space occurs before reception of M-PDCCH is ended, the UE may determine that the M-PDCCH that the UE is receiving is invalid, and may not perform reception of the corresponding M-PDCCH.

Method 3. If subframe(s) configuring two search spaces are overlapped with each other, the UE may determine that a search space existing at an earlier time is invalid, and may not perform reception of M-PDCCH for one of the two search space, which is first started in a time domain.

FIG. 13 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include N, (where N, is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor of the present invention may configure or reconfigure CSS_paging in accordance with section 1, section 5 and/or section 6. The eNB processor may control the eNB RF unit to transmit SIB or RRC message, which includes configuration for CSS_paging, to the UE in accordance with section 1, section 5 and/or section 6. The eNB processor may control the eNB RF unit to transmit M-PDCCH for scheduling a paging message within CSS_paging according to CSS_paging configuration. The UE processor of the present invention may control the UE RF unit to receive configuration or reconfiguration information on CSS_paging from the eNB in accordance with section 1, section 5 and/or section 6. The UE may attempt reception of paging M-PDCCH from CSS_paging according to the CSS_paging configuration.

The eNB processor of the present invention may configure or reconfigure CSS_RAR in accordance with section 2, section 5 and/or section 6. The eNB processor may control the eNB RF unit to transmit SIB or RRC message, which includes configuration for CSS_RAR, to the UE in accordance with section 2, section 5 and/or section 6. The eNB processor may control the eNB RF unit to transmit M-PDCCH for scheduling RAR, Msg3 and/or Msg4 within a CSS according to CSS_RAR configuration. The UE processor of the present invention may control the UE RF unit to receive configuration or reconfiguration information on CSS_RAR from the eNB in accordance with section 2, section 5 and/or section 6. The UE may attempt reception of RAR M-M-PDCCH, Msg3 M-PDCCH and/or Msg4 M-PDCCH from the CSS according to the CSS_RAR configuration.

The eNB processor of the present invention may configure or reconfigure CSS_others in accordance with section 3, section 5 and/or section 6. The eNB processor may control the eNB RF unit to transmit SIB or RRC message, which includes configuration for CSS_others, to the UE in accordance with section 3, section 5 and/or section 6. The eNB processor may control the eNB RF unit to transmit M-PDCCH for other purpose within a CSS according to CSS_others configuration. The UE processor of the present invention may control the UE RF unit to receive configuration or reconfiguration information on CSS_others from the eNB in accordance with section 3, section 5 and/or section 6. The UE may attempt reception of M-PDCCH for other purpose from the CSS according to the CSS_others configuration.

The eNB processor of the present invention may transmit initial configuration for CSS through SIB in accordance with section 6. The eNB processor may configure CSS and/or USS in accordance with the initial configuration until the other configuration (e.g., UE-specific configuration/reconfiguration) for SS is transmitted. The initial configuration may include a configuration (e.g., narrowband, PRB-set(s), starting subframe and/or period, and the number of maximum repetitions of SS) of time-frequency resources of SS. The eNB processor may transmit M-PDCCH in accordance with the initial configuration until the other configuration for SS is transmitted. For example, the eNB processor may control the eNB RF unit to transmit M-PDCCH by applying the number of repetitions R based on maximum $R_{max}$ according to the initial configuration within the PRB-set according to the initial configuration on a narrowband according to the initial configuration. If the other configuration for SS is transmitted, the eNB processor may control the eNB RF unit to transmit M-PDCCH on the SS configured in accordance with the other configuration. The UE processor may receive the initial configuration for CSS through SIB in accordance with section 6. The UE processor may assume that CSS and/or USS is configured in accordance with the initial configuration until the other configuration (e.g., UE-specific configuration/reconfiguration) for SS is received. The UE processor may monitor M-PDCCH in accordance with the initial configuration until the other configuration for SS is transmitted. For example, the UE processor may control the UE RF unit to receive or monitor M-PDCCH by applying the number of repetitions R based on maximum $R_{max}$ according to the initial configuration within the PRB-set according to the initial configuration on a narrowband according to the initial configuration. If the other configuration for SS is received, the UE processor may control the UE RF unit to receive or monitor M-PDCCH on the SS configured in accordance with the other configuration.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:

1. A method for receiving, by a user equipment (UE), downlink control information (DCI) for the UE, the method comprising:
receiving, by the UE, a common search space configuration for a common search space;
receiving, by the UE, a first physical downlink control channel (PDCCH) scheduling a message related to a random access response by monitoring first PDCCH candidates of the common search space based on the common search space configuration; and
receiving, by the UE, a second PDCCH carrying the DCI for the UE by monitoring second PDCCH candidates of a UE-specific search space,
wherein the second PDCCH candidates of the UE-specific search space are monitored based on a configuration identical to the common search space configuration until the UE receives a UE-specific search space configuration,
wherein the common search space configuration comprises information on a maximum number of repetitions for the common search space, and
wherein the second PDCCH candidates of the UE-specific search space are monitored based on a number identical to the maximum number of repetitions for the common search space until the UE receives the UE-specific search space configuration.

2. The method of claim 1, wherein the common search space configuration further comprises information on a narrowband for the common search space, and
wherein the second PDCCH candidates of the UE-specific search space are monitored on the identical narrowband as the common search space until the UE receives the UE-specific search space configuration.

3. The method of claim 1, wherein the common search space configuration further comprises information on a first physical resource block (PRB) set for monitoring the first PDCCH, and
wherein the first PRB set is used for monitoring the second PDCCH candidates until the UE receives a UE-specific search space configuration.

4. The method of claim 1, wherein the first PDCCH candidates of the common search space are monitored based on aggregation levels larger than or equal to 8 among a plurality of aggregation levels, and the second PDCCH candidates of the UE-specific search space are monitored based on the plurality of aggregation levels.

5. A method for transmitting, by a base station (BS), downlink control information (DCI) for a user equipment (UE), the method comprising:
transmitting, by the BS, common search space configuration for a common search space;
transmitting, by the BS to the UE, a first physical downlink control channel (PDCCH) scheduling a message related to a random access response by using one of first PDCCH candidates of the common search space based on the common search space configuration; and
transmitting, by the BS to the UE, a second PDCCH carrying the DCI for the UE by using one of second PDCCH candidates of a UE-specific search space,
wherein the second PDCCH candidates of the UE-specific search space are configured based on a configuration identical to the common search space configuration until a UE-specific search space configuration is transmitted to the UE,
wherein the common search space configuration comprises information on a maximum number of repetitions for the first common search space, and
wherein the second PDCCH candidates of the UE-specific search space are configured based on a number identical to the maximum number of repetitions for the common search space until the UE-specific search space configuration is transmitted to the UE.

6. The method of claim 5, wherein the common search space configuration further comprises information on a narrowband for the common search space, and
wherein the second PDCCH candidates of the UE-specific search space are configured on the identical narrowband as the common search space until the UE-specific search space configuration is transmitted to the UE.

7. The method of claim 5, wherein the common search space configuration further comprises information on a first physical resource block (PRB) set for transmitting the first PDCCH, and
wherein the first PRB set is used for the second PDCCH candidates until the UE-specific search space configuration is transmitted to the UE.

8. The method of claim 5, wherein the first PDCCH candidates of the common search space are configured based on aggregation levels larger than or equal to 8 among a plurality of aggregation levels, and the second PDCCH candidates of the UE-specific search space are configured based on the plurality of aggregation levels.

9. A user equipment (UE) for receiving downlink control information (DCI) for the UE, the UE comprising:
 a memory; and
 at least one processor coupled with the memory and configured to:
  receive common search space configuration for a common search space;
  receive a first physical downlink control channel (PDCCH) scheduling a message related to a random access response by monitoring first PDCCH candidates of the common search space based on the common search space configuration; and
  receive a second PDCCH carrying the DCI for the UE by monitoring second PDCCH candidates of a UE-specific search space,
  wherein the second PDCCH candidates of the UE-specific search space are monitored based on a configuration identical to the common search space configuration until the UE receives a UE-specific search space configuration,
  wherein the common search space configuration comprises information on a maximum number of repetitions for the common search space, and
  wherein the second PDCCH candidates of the UE-specific search space are monitored based on a number identical to the maximum number of repetitions for the common search space until the UE receives the UE-specific search space configuration.

10. The UE of claim 9, wherein the common search space configuration further comprises information on a narrowband for the common search space, and
 wherein the second PDCCH candidates of the UE-specific search space are monitored on the identical llsamell narrowband as the common search space until the UE receives a UE-specific search space configuration.

11. The UE of claim 9, wherein the common search space configuration further comprises information on a first physical resource block (PRB) set for monitoring the first PDCCH, and
 wherein the the first PRB set is used for monitoring the second PDCCH candidates until the UE receives a UE-specific search space configuration.

12. The UE of claim 9, wherein the first PDCCH candidates of the common search space are monitored based on aggregation levels larger than or equal to 8 among a plurality of aggregation levels, and the second PDCCH candidates of the UE-specific search space are monitored based on the plurality of aggregation levels.

13. A base station (BS) for transmitting downlink control information (DCI) to a user equipment (UE), the BS comprising:
 a memory; and
 at least one processor coupled with the memory and configured to:
  transmit common search space configuration for a common search space;
  transmit, to the UE, a first physical downlink control channel (PDCCH) scheduling a message related to a random access response by using one of first PDCCH candidates of the common search space based on the common search space configuration; and
  transmit, to the UE, a second PDCCH carrying the DCI for the UE by using one of second PDCCH candidates of a UE-specific search space,
  wherein the second PDCCH candidates of the UE-specific search space are configured based on a configuration identical to the common search space configuration until a UE-specific search space configuration is transmitted to the UE,
  wherein the common search space configuration comprises information on a maximum number of repetitions for the first common search space, and
  wherein the second PDCCH candidates of the UE-specific search space are configured based on a number identical to the maximum number of repetitions for the common search space until the UE-specific search space configuration is transmitted to the UE.

14. The BS of claim 13, wherein the common search space configuration further comprises information on a narrowband for the common search space, and
 wherein the second PDCCH candidates of the UE-specific search space are configured on the identical narrowband as the common search space until the UE-specific search space configuration is transmitted to the UE.

15. The BS of claim 13, wherein the common search space configuration further comprises information on a first physical resource block (PRB) set for transmitting the first PDCCH, and
 wherein the first PRB set is used for the second PDCCH candidates until the UE-specific search space configuration is transmitted to the UE.

16. The BS of claim 13, wherein the first PDCCH candidates of the common search space are configured based on aggregation levels larger than or equal to 8 among a plurality of aggregation levels, and the second PDCCH candidates of the UE-specific search space are configured based on the plurality of aggregation levels.

* * * * *